United States Patent [19]
Ohmura et al.

[11] Patent Number: 6,148,540
[45] Date of Patent: Nov. 21, 2000

[54] PULVERIZED BODY DRYING METHOD AND APPARATUS

[75] Inventors: Yukimasa Ohmura, Yotsukaido; Takeshi Kato, Tokyo; Kenji Ono, Yokosuka; Atsushi Omachi, Komae, all of Japan

[73] Assignee: Nara Machinery Co., Ltd., Tokyo, Japan

[21] Appl. No.: 09/101,016

[22] PCT Filed: Dec. 24, 1996

[86] PCT No.: PCT/JP96/03751

§ 371 Date: Mar. 18, 1999

§ 102(e) Date: Mar. 18, 1999

[87] PCT Pub. No.: WO97/24570

PCT Pub. Date: Jul. 10, 1997

[30] Foreign Application Priority Data

Dec. 30, 1995 [JP] Japan ................................... 7-353110

[51] Int. Cl.[7] ............................................. F26B 3/08
[52] U.S. Cl. .......................... 34/360; 34/364; 34/369; 34/375; 34/579; 34/231; 34/232; 110/224; 432/99
[58] Field of Search .................. 34/359, 360, 364, 34/369, 375, 487, 488, 492, 579, 582, 588, 179, 181, 231, 232; 110/224; 432/99

[56] References Cited

U.S. PATENT DOCUMENTS

| | | |
|---|---|---|
| 2,292,897 | 8/1942 | Nielsen . |
| 3,915,657 | 10/1975 | Staffin et al. . |
| 4,089,119 | 5/1978 | Heinze . |
| 4,106,892 | 8/1978 | Haga et al. ................... 432/58 |
| 5,593,715 | 1/1997 | Christensen ................... 426/467 |

FOREIGN PATENT DOCUMENTS

| | | |
|---|---|---|
| 44-10394 | 5/1969 | Japan . |
| 45-28231 | 10/1970 | Japan . |
| 50-14385 | 5/1975 | Japan . |
| 58-51187 | 4/1983 | Japan . |

OTHER PUBLICATIONS

International Search Report mailed Apr. 1, 1997 in PCT/JP96/03751.

*Primary Examiner*—Pamela Wilson
*Attorney, Agent, or Firm*—Varndell & Varndell, PLLC

[57] ABSTRACT

The present invention provides a particulate drying method and drying apparatus, which can disperse particulates in the drying apparatus, prolong the particulate residence time, and improve the drying conditions, while retaining the advantages of conventional flash dryers.

20 Claims, 17 Drawing Sheets

PULVERIZED BODY DRYING METHOD AND APPARATUS

TECHNICAL FIELD

The present invention relates to a particulate drying method and drying apparatus, and more particularly to a particulate drying method and drying apparatus which are used to dry particulates.

BACKGROUND ART

Flash dryers and fluidized bed dryers have been the primary devices known in the past for drying particulates using heated gas.

Here, a flash dryer is a dryer having a structure in which an ascending air current is formed by heated gas in a cylindrical straight pipe, the particulates are fed into the ascending air current, and the particulates are dried while carried aloft by the ascending air current.

Advantages of such flash dryers are that they have a simple structure, and the particulates are dried at the same time that the air is transported, resulting in high treatment capacity.

On the other hand, the ascending air current is formed only in the straight pipe in such flash dryers, resulting in less dispersion of the particulates that are supplied as the material being treated, and when wet particulates or the like which have formed into lumps are treated, a disperser or beater or the like must be provided near the opening through which the treated material is supplied. A resulting problem is that particulates end up adhering to the mechanical dispersion mechanism, such as the attached disperser or beater.

Furthermore, since the supplied particulate travels along with the ascending air current formed in the straight pipe, lengthening the straight pipe is the only way to prolong the particulate residence time in the straight pipe and to improve the drying conditions (slowing the flow rate of the ascending air current limits the amount treated and the like), leading to an increase in the size of the equipment.

In addition, since the particulates travel along with the ascending air current in the straight pipe in such devices, often the same heated gas is in contact with the particulates as they travel. There is thus some concern that the heat exchange between the particulates and the heated gas as well as the evaporation of moisture from the particulates heated by this heat exchange reach a critical state soon after contact between the particulates and heated gas, with a dramatic decrease in the subsequent heat exchange and evaporation. A method that has been adopted to increase drying efficiency is to provide a curved part in the middle of the straight drying pipe, so as to abruptly alter the direction of flow in the curved part and thus produce instantaneous changes in the rate between the particulates and the accompanying heated gas, thereby exchanging the heated gas. However, in this case as well, the particulate residence time cannot be prolonged, and it is difficult to dry the particulate to below the specified moisture. A problem is thus that wet particulates adhere to the curved part provided in the middle of the drying pipe, in the same manner as when a disperser, beater, or the like is provided as described above.

Particulates adhering inside the device as described above hinder the operating stability of the apparatus. In addition, material adhering inside the device sometimes falls off as a result of frequent heat degeneration and thermal deterioration, becoming mixed in the form of impurities with the final product. Such contamination of the final product is a major issue.

The particulate drying action in the flash dryer depends solely on the quantity of heat of the heated gas, so attaching equipment to increase the amount of hot air, elevate the hot air temperature, and the like in order to enhance the extent of drying leads to the problems of greater size and higher running costs.

Fluidized bed dryers which are widely known as apparatuses for drying particulates using heated gas in a manner similar to that of flash dryers are apparatuses having a structure in which the container is divided into two upper and lower chambers by a perforated plate such as a wire netting, the upper chamber is filled with the particulates, and the heated gas is blown from the lower chamber through the perforated plate into the upper chamber, causing the particulates to fluidize and dry.

In such a fluidized bed dryer, the drying time can be set as desired, and the particulates can always be kept in contact with fresh heated gas, resulting in the advantage that the particulates can be dried to an extremely low moisture content. Another advantage is that such fluidized bed dryers allow the particulates to be uniformly dried.

However, when fluidized bed dryers are used in the case of particulates having a high moisture content, the particulate layer is difficult to fluidize, and the particulates are not adequately dispersed. As a result, dumpling-shaped lumps are produced in the final product, and there are also problems such as particulate adhesion on the machine walls.

Thus, when particulates having a high moisture content are dried, the particulates are generally first dried in a flash dryer such as that described above to a moisture that will not result in adhesion or lumps, and a fluidized bed dryer is then often used as a finishing dryer.

In view of the problems described above in conventional flash dryers and fluidized bed dryers in which particulates are dried by heated gas, an object of the present invention is to provide a particulate drying method and drying apparatus which can promote the dispersion of the particulates in the dryer and prolong the particulate residence time so as to improve the drying conditions while retaining the advantages of conventional flash dryers.

DISCLOSURE OF THE INVENTION

To achieve the object described above, the present invention is a method for drying particulates, wherein a spirally ascending air current is formed by heated gas inside a cylindrical container having an internal space, the horizontal cross section of which is in the form of concentric circles at any height, and particulates are dried by being dispersed and allowed to float in the spirally ascending air current.

The present invention is also an apparatus for drying particulates, comprising a cylindrical container having an internal space, the horizontal cross section of which is in the form of concentric circles at any height, a particulate and heated gas feed pipe which is connected to the bottom of the cylindrical container, a spiraling mechanism for converting the heated gas introduced from the feed pipe into a spirally ascending air current inside the cylindrical container, and a particulate and heated gas discharge pipe which is connected to the top of the cylindrical container.

In the particulate drying method and drying apparatus pertaining to the present invention, particulates travel upward from below along with a spirally ascending air current created by heated gas inside the cylindrical container. The particulates are subject to centrifugal force as well as the upward force of the spirally ascending air current as they travel, and even particulates in the form of wet lumps are broken down and are dried in a good dispersed state.

Because the particulates ascend while spiraling inside the cylindrical container in the present invention, the travel distance is far longer than when they travel along with an air current that merely ascends. The particulates are in contact with constantly changing gas as a result of differences in rate due to differences in the friction resistance between the internal wall surface of the container and the heated gas in contact with the particulates as they travel, thereby allowing greater amounts of heat to be exchanged and the particulate drying state to be improved.

In the present invention, the centrifugal force of the spirally ascending air current affecting the particulates is greater the higher the particulate density due to wetting. As a result, particulates that have just been introduced and particulates with a greater moisture content than others spiral over long periods of time near the internal peripheral wall surface of the cylindrical container, and the residence time is thus prolonged, resulting in better drying conditions and allowing more uniform drying to be achieved.

Here, as a method for forming a spirally ascending air current in the cylindrical container in the present invention, a heated gas is preferably introduced in a tangential direction from the entire periphery of the bottom side wall of the cylindrical container. Alternatively, the heated gas is preferably introduced in a tangential direction from the entire periphery of the bottom side wall of the cylindrical container, while heated gas is also introduced in a roughly circumferential direction concentric with the cylindrical container from the entire surface of the bottom wall of the cylindrical container.

As a spiraling mechanism for implementing such a method, the entire periphery of the bottom side wall of the cylindrical container is made of a perforated plate in which are formed a plurality of blow holes arranged so that the openings face in a tangential direction of the cylindrical container, the periphery of the perforated plate is enclosed by a container, and the heated gas feed pipe is connected to this container. Alternatively, the entire periphery of the bottom side wall of the cylindrical container is made of a perforated plate in which are formed a plurality of blow holes arranged so that the openings face in a tangential direction of the cylindrical container, the periphery of the perforated plate is enclosed by a container, and the heated gas feed pipe is connected to this container, while the entire surface of the bottom wall of the cylindrical container is made of a perforated plate in which are formed a plurality of blow holes arranged so that the openings face in a roughly circumferential direction concentric with the cylindrical container, the bottom of the perforated plate is enclosed by a container, and the heated gas feed pipe is connected to this container.

This has the effect of allowing the spirally ascending air current thus formed to prevent the adhesion and accumulation of particulates on the internal wall surface of the cylindrical container immediately following their introduction in their wettest state, as well as prolonging the residence of the wet particulates as they spiral at the bottom of the container without ascending.

That is, the spirally ascending air current provides centrifugal force to the particulates as described above, so there is concern that the particulates will be forced against the internal wall surface of the cylindrical container, where they will adhere and accumulate. This phenomenon is most pronounced at the bottom of the cylindrical container where the particulates being treated are introduced. When the heated gas is introduced in a tangential direction from the entire periphery of the bottom side wall at the bottom of the cylindrical container where there is most concern over the adhesion and accumulation of particulates, or the heated gas is introduced in a tangential direction from the entire periphery of the bottom side wall of the cylindrical container while heated gas is also introduced in a roughly circumferential direction concentric with the cylindrical container from the entire surface of the bottom wall of the cylindrical container, a spirally ascending air current is formed in the cylindrical container, allowing the particulates to spiral therein, and a so-called air carton is formed by the heated gas near the bottom side wall of the cylindrical container or near the bottom side wall and the bottom wall. This air carton can prevent the particulates from coming into direct contact with the inner wall surface of the cylindrical container so as to prevent them from adhering and accumulating there. Heated gas which is blown in a tangential direction from the entire periphery of the bottom side wall forms, in that location, a rapidly spiraling air current, referred to as an air ring, which is wider in the center than at the side wall, and this air ring causes wet particulates to remain while circling at the bottom of the container without ascending, thereby promoting particulate drying.

In the present invention, the cylindrical container is preferably heated from the outer peripheral surface. The structure for heating the cylindrical container from the outer peripheral surface is preferably constructed in such a way that the outer peripheral wall surface of the cylindrical container is enclosed by a jacket, and a heat medium is supplied into the space formed between the jacket and the outer peripheral wall surface of the cylindrical container.

In the present invention, the particulates described above are subject to the centrifugal force of the spirally ascending air current formed in the cylindrical container, and they travel while forced against the inner peripheral wall surface of the cylindrical container. This is desirable because, when the cylindrical container is heated, the particulates are effectively dried by means of heat transfer by conduction from the cylindrical container.

In the present invention, the cylindrical container is preferably constructed so as to be dividable at suitable locations in the axial direction. As a structure for implementing this construction, the cylindrical container is divided at any location in the axial direction, flanges are provided at the open end surface of the divided parts, and the flanges are detachably joined face-to-face with a clamp or the like.

This is desirable because, when the cylindrical container is dividably constructed in the manner described above, the apparatus is easier to assemble and disassemble, the interior of the container is easy to clean, and the length of the container can be shortened or conversely lengthened as needed.

In the present invention, an air current spiraling at a high speed, that is, an air ring, in the same direction as the spirally ascending air current, is preferably formed in a location at any height inside the cylindrical container. To form this air ring, the entire periphery of the side wall at any location of the cylindrical container is preferably made of a perforated plate having a plurality of blow holes arranged so that the openings face in the same direction as the spiraling direction of the spirally ascending air current formed in the cylindrical container, the periphery of the perforated plate is enclosed by a container, and the heated gas feed pipe is connected to this container, thereby forming an air ring at that location.

This is desirable because, when such an air ring is located in the middle of the cylindrical container, the air ring keeps in that location the particulates which have traveled up along the inner wall of the cylindrical container while spiraling up along with the spirally ascending air current, so that the particulates kept there can have sufficient residence time while in actual contact with fresh heated gas in that location, resulting in better drying conditions.

In the present invention, the diameter of the spiral of the spirally ascending air current formed in the cylindrical container is preferably wider in the middle of the ascent. To thus widen the spiral diameter, the cylindrical container having a horizontal cross section in the form of concentric circles at any height is preferably a cylindrical container in which the horizontal cross section is in the form of concentric circles that are wider in the middle in the axial direction than the other parts.

This is desirable because, when such a wider part is located in the middle, the rate at which the spirally ascending air current ascends is suddenly lowered in the wider part, and the particulates ascend at a lower rate, allowing the particulate residence time in the container to be prolonged. In addition, the heated gas and particulates are forcibly separated by the differences in centrifugal force in the wider part, allowing the particulates to come into actual contact with fresh heated gas. As a result, when the wider part is located in the middle, the drying conditions for the particulates are better, just as they are when an air ring is provided.

When the spiral diameter of the spirally ascending air current formed in the cylindrical container is wider in the middle of the ascent, the cylindrical container is preferably heated from the outer peripheral surface with a structure similar to that described above at the location where the spiral diameter is wider, or heated gas is preferably also introduced in the same direction as the spiraling direction of the spirally ascending air current with a structure similar to that described above at the location where the spiral diameter is wider, because the wider part is where the particulates are kept as described above, making the particulates susceptible to the heat transfer by conduction from the cylindrical container, and the particulates can come into contact with the low humidity heated gas that has been introduced, further improving the drying conditions.

When an air ring is formed at a location at any height in the cylindrical container, the outer peripheral surface of the cylindrical container is preferably heated with a structure similar to that described above at a location below where the air ring has been formed, for the same reasons as described above.

In the present invention, when the particulates being dried do not adhere very much, a heated gas may be introduced from a tangential direction at the bottom side wall of the cylindrical container so as to form the spirally ascending air current in the cylindrical container, and the particulates and heated gas may be simultaneously introduced from a tangential direction at the bottom side wall of the cylindrical container. In this case, however, the spiral diameter of the spirally ascending air current formed in the cylindrical container is preferably wider in the middle of the ascent, or an air ring is formed at a location at any height inside the cylindrical container, or another such means is employed, so as to increase the drying efficiency.

It is preferable to use the dryer pertaining to the present invention with a conventional flash dryer, that is, the outlet side end of the drying pipe of the flash container is connected in a tangential direction at the bottom side wall of the cylindrical container, so as to form the spirally ascending air current inside the cylindrical container, and the particulates that have been dried by the flash dryer are preferably then dried again by the drying method and drying apparatus pertaining to the present invention.

This is preferable because more efficient drying is possible, such as a lower optimal particulate moisture at the heated gas temperature and amount of air used in flash dryers, greater treated quantities when the optimal moisture is the same, and the like.

BEST MODE FOR CARRYING OUT THE INVENTION

Embodiments of the present invention are described below with reference to the figures.

Figure 1:
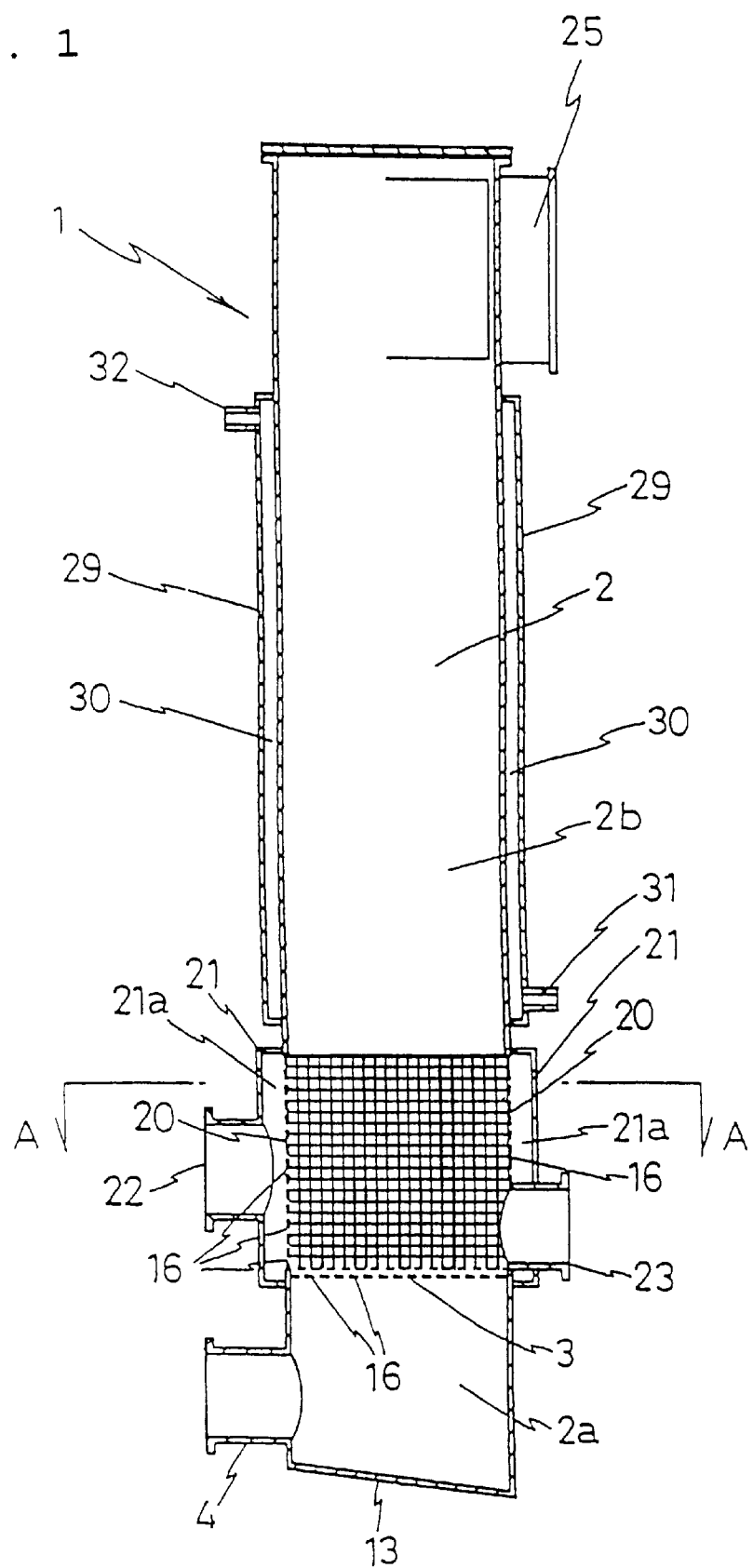
FIG. 1 is a vertical cross section of a first embodiment of the apparatus of the present invention.
Figure 2:
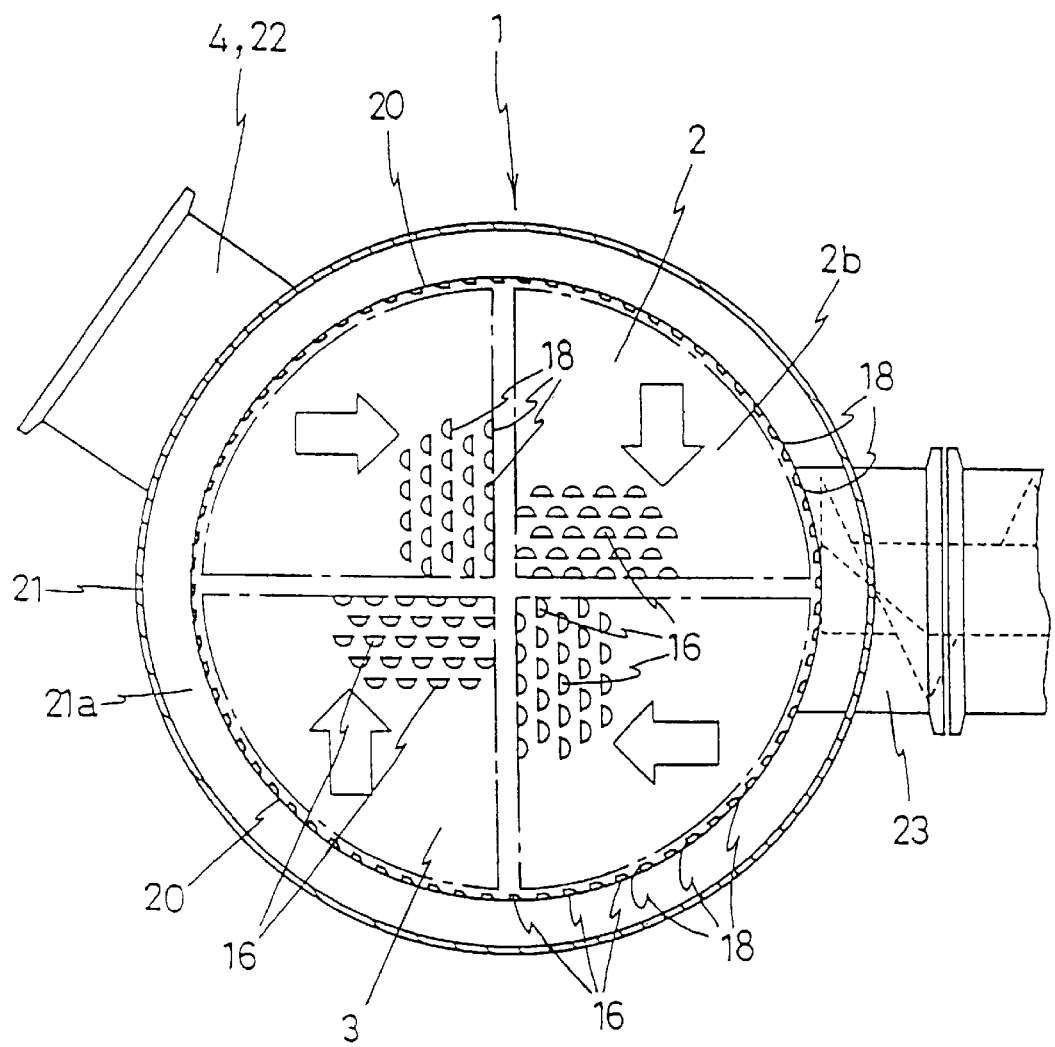
FIG. 2 is an enlarged cross section of the portion along line A—A in FIG. 1.
Figure 3:
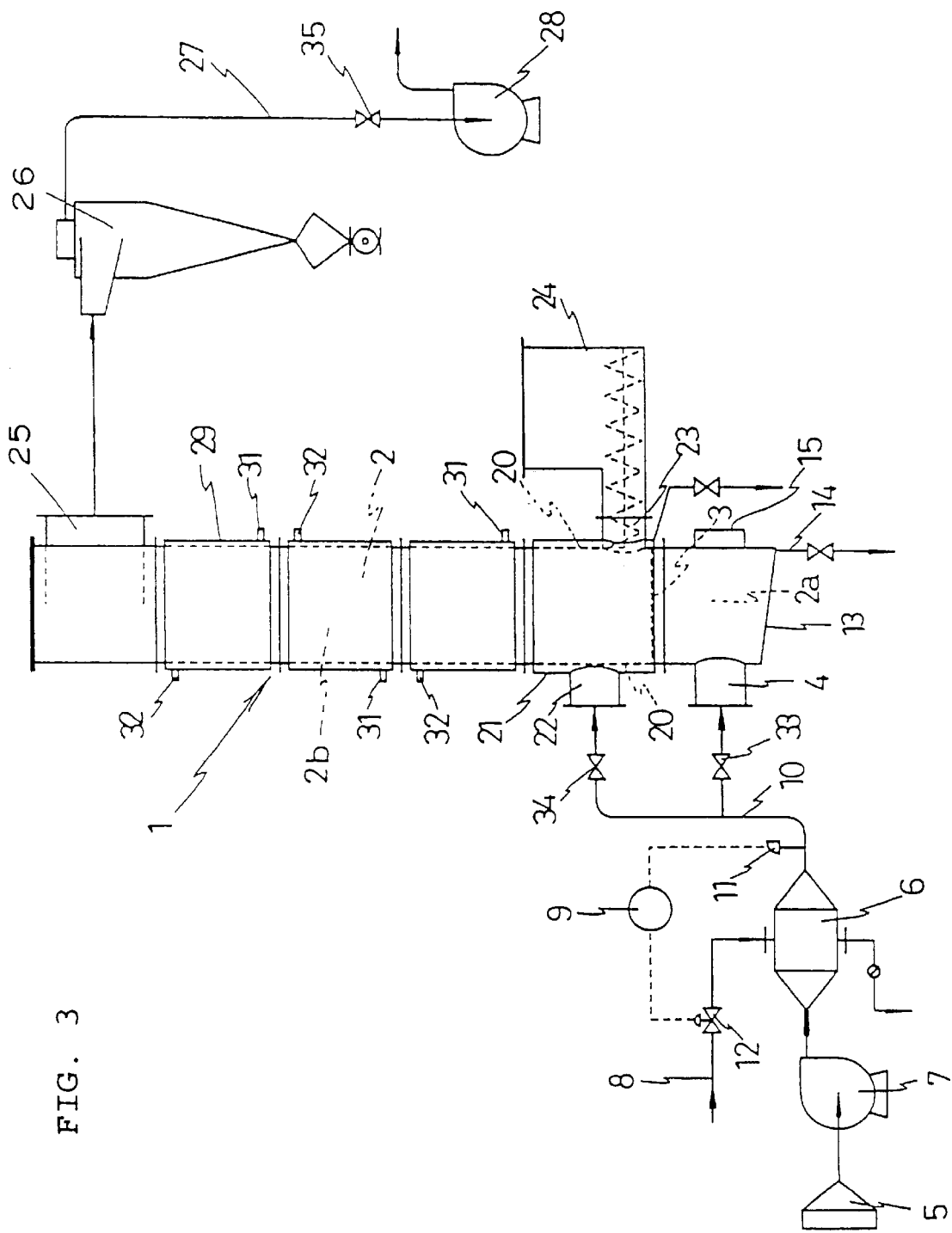
FIG. 3 depicts the apparatus of the present invention along with devices which are needed before and after it.

FIGS. 1 through 3 depict a first embodiment of the present invention. In FIGS. 1 through 3, 1 is a cylindrical container having an internal hole 2, the horizontal cross section of which is in the form of concentric circles at any height. The cylindrical container 1 is formed longer in the axial direction than in the diameter direction, and both ends are closed. The container is set up with the axis facing in the perpendicular direction. The cylindrical container 1 is not limited to the cylindrical configuration shown in the figure, however, and may also be in the form of a truncated cone with the diameter widening or narrowing toward the bottom, or the container may be wider in the middle in the heightwise direction, as in the shape of a beer keg.

A perforated plate 3 is arranged at the bottom of the cylindrical container 1. The internal space 2 of the cylindrical container 1 is divided by the perforated plate 3 into a lower hot air chamber 2a and upper drying chamber 2b. The perforated plate 3 is not limited to the flat plate depicted in the figure, however, and may also be formed in the shape of a cone with an upwardly or downwardly protruding center, for example. In particular, a guide tube (not shown in figure) for intermittently or continuously discharging particulates that have accumulated and have not been entrained by the air current may be connected to the lowermost part when the perforated plate is in the form of a cone with an upwardly or downwardly protruding center.

A heated gas feed pipe 4 is connected to the side surface (or bottom surface) of the hot air chamber 2a formed at the bottom of the cylindrical container 1. As shown in FIG. 3, air which has been cleaned by an air filter 5 and which has been heated by an air heater 6 is supplied through the feed pipe 4 into the hot air chamber 2a by the blowing action of a supply blower 7.

In FIG. 3, 8 is a heat medium (such as water vapor) feed pipe for supplying a heat medium to the air heater 6. 9 is a temperature control device provided at the feed pipe 8, and is constructed in such a way as to control the opening and closing of a valve 12 provided in the feed pipe 8 in response to the temperature of the heat medium detected by a temperature detector 11 provided in the middle of the heated gas feed pipe 10.

The bottom surface 13 of the hot air chamber 2a does not need to be horizontal, and may be in the form of a cone with a downwardly or upwardly protruding center or may be inclined in one direction as shown in the figure. This is particularly desirable because, when the bottom surface 13 is inclined in one direction, as shown in the figure, no washing water accumulates at the bottom surface 13 when the container 1 is washed, and all the washing water can be discharged through the discharge pipe 14 provided at the lowermost part. When a hand hole 15 is provided as shown in FIG. 3 at the side surface of the hot air camber 2a, the hot air chamber 2a is more easily inspected, cleaned, and the like.

Figure 4:
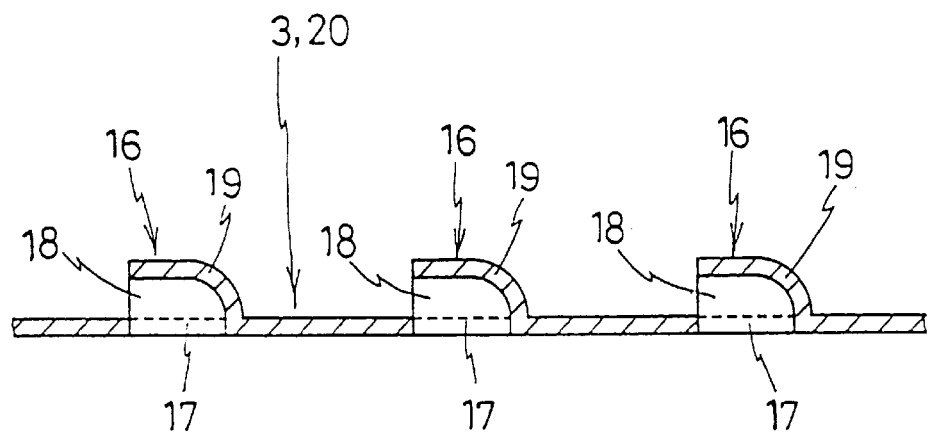
FIG. 4 is an enlarged cross section of the perforated plate used in the apparatus pertaining to the present invention.
Figure 5:
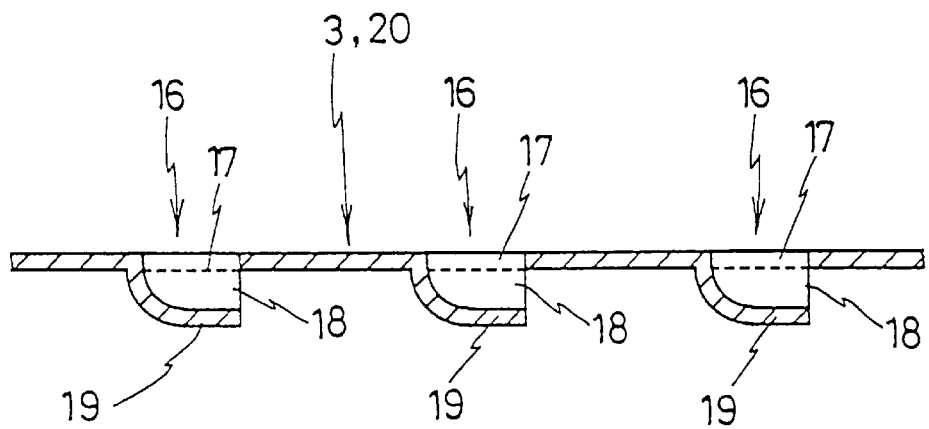
FIG. 5 is an enlarged cross section of another perforated plate used in the apparatus pertaining to the present invention.
Figure 6:
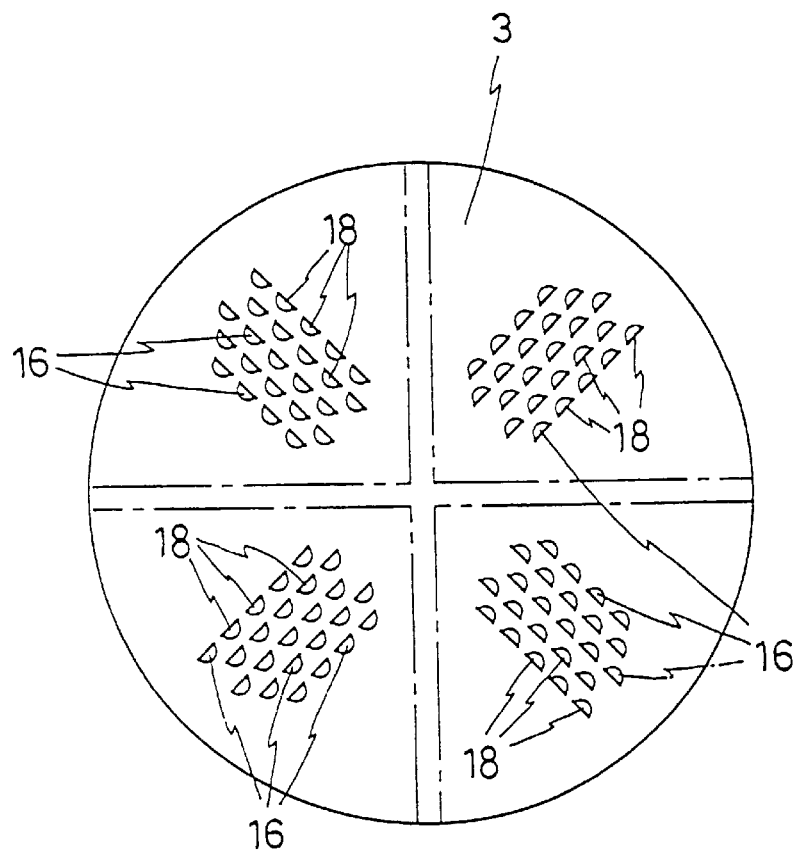
FIG. 6 is a plan of a perforated plate used in the apparatus pertaining to the present invention.
Figure 7:
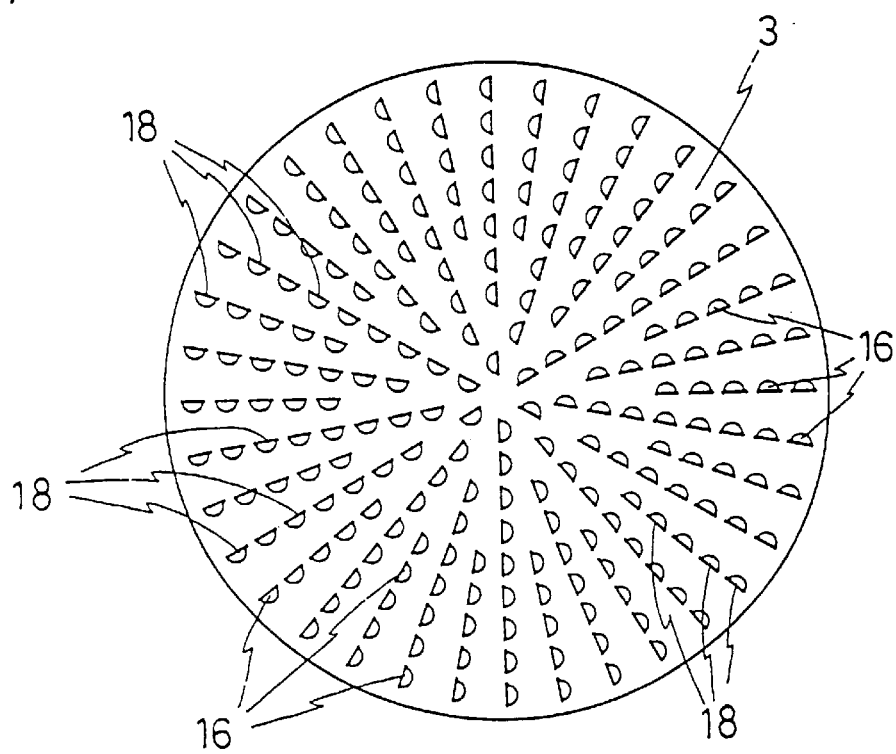
FIG. 7 is a plan of another perforated plate used in the apparatus pertaining to the present invention.

A plurality of blow holes 16 are formed in the perforated plate 3 dividing the bottom part of the cylindrical container 1, so that the heated gas introduced from the hot air chamber 2a through the perforated plate 3 to the drying chamber 2b produces a spirally ascending air current. As shown in FIG. 4, for example, the configuration of the blow holes 16 is such that the top of the hole 17 is enclosed by a roof-shaped protrusion 19 so that the opening 18 of the hole 17 faces in a side direction that is roughly parallel to the flat surface of the flat plate. A plurality of blow holes 16 having this configuration are arranged so that the openings 18 in the quarter circles shown in FIG. 2 face in roughly the circumferential direction concentric with the cylindrical container 1, and the openings 18 within the circumferentially adjoining quarter circles are set off 90° from each other. The blow holes 16 formed in the perforated plate 3 may be shaped with the roof-shaped protrusions 19 facing downward as shown in FIG. 5, and the blow holes may be in the form of long so-called slits. The disposition of the blow holes 16 may also be such that the openings 18 face in the same direction within the range of the precisely divided angles shown in FIG. 2. As shown in FIGS. 6 or 7, moreover, the arrangement may also be such that the openings 18 of the blow holes 16 are facing roughly at right angles to the radial direction. In FIGS. 4 and 5, the upper side of the perforated plate 3 is the drying chamber 2b, and the lower side is the hot air chamber 2a. In these figures, the heated gas passes from the hot air chamber 2a through the holes 17 from the lower right to the upper left, flows along the upper surface of the perforated plate 3 from the right side to the left side, and is introduced into the drying chamber 2b.

The inner peripheral wall surface of the container 1 located directly above the perforated plate 3 is made of a perforated plate 20 in which the same type of blow holes 16 as those shown in FIG. 4 (or 5) (these blow holes 16 may also be blow holes in the form of so-called long slits in the same manner as the blow holes 16 of the perforated plate 3 above) are formed along the entire periphery at a constant breadth. The plurality of blow holes 16 of the perforated plate 20 are arranged so that the openings 18 of the blow holes 16 are facing systematically in a tangential direction of the container as shown in FIG. 2. The heated gas supplied through the perforated plate 20 into the drying chamber 2b thus also forms a spiraling air current in roughly the horizontal direction in the same direction as the spiraling air current formed in the drying chamber 2b by the porous plate 3.

The blow holes 16 of the bottom part of the perforated plate 20 are preferably as near as possible to the perforated plate 3. The junction between the perforated plate 20 and the perforated plate 3 need not be at right angles as shown in the figure, and is preferably constructed in such a way that a suitable curvature or angle is provided in the corner, the heated gas blow holes 16 are also arranged in the corner, and the heated gas is blown through. This is because particulates can be prevented from adhering to and accumulating in the corner when such a corner is provided. The axial breadth of the perforated plate 20 is wide enough to reach the top of the connecting part of the particulate feed pipe 23 described below.

The entire periphery and breadth of the perforated plate 20 constituting the inner peripheral wall surface of the bottom of the cylindrical container 1 is completely enclosed by a container 21. A hot air chamber 21a is formed between this container 21 and the perforated plate 20. A heated gas feed pipe 22 is connected to the side surface of the hot air chamber 21a, and air which has been cleaned by an air filter 5 and heated by an air heater 6 in the same manner as the hot air chamber 2a shown in FIG. 3 is supplied through the feed pipe 22 by the blowing action of a supply blower 7.

Figure 8:
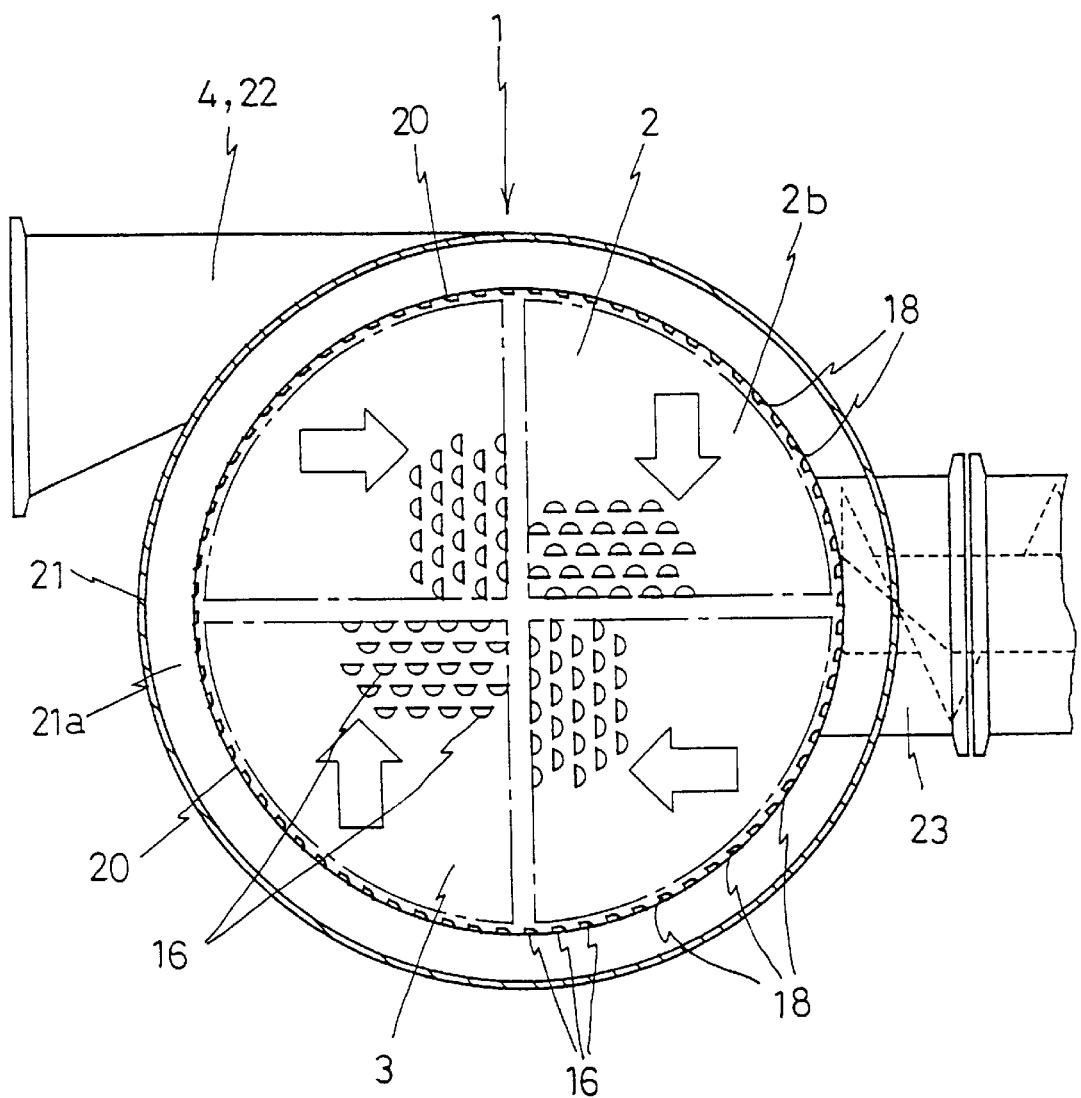
FIG. 8 is an enlarged cross section of another structure for the part along line A—A in FIG. 1.

In FIG. 2, the heated gas feed pipe 22 is connected at right angles to the wall surface of the container 21, but, as shown in FIG. 8, the feed pipe 22 is preferably connected to the wall surface of the container 21 from the direction in which the openings 18 of the blow holes of the perforated plate 20 are facing, that is, a roughly tangential direction in the same rotating direction as the spirally ascending air current formed in the cylindrical container 1.

When the feed pipe 22 is connected in the direction at right angles to the wall surface of the container 21 as shown in FIG. 2, the heated gas introduced through the feed pipe 22 strikes against the perforated plate 20 and is thus divided to the left and right, flowing into the hot air chamber 21a. The heated gas flowing into the hot air chamber 21a from the same rotating direction as the spirally ascending air current (left side viewed from the feed pipe 22 side in the figure) is vigorously blown through the blow holes 16 of the perforated plate 20 into the drying chamber 2b. However, heated gas flowing in from the direction rotating opposite the spirally ascending air current (left side viewed from the feed pipe 22 side in the figure) is opposite the direction of the openings 18, slowing down the speed of this heated gas, so it is not readily blown through the blow holes 16 into the drying chamber 2b. As a result, the amount of heated gas supplied from the blow holes 16 into the drying chamber 2b is not uniform, and the flow rate of the spirally ascending air current formed in the drying chamber 2b is not uniform.

In addition to the above, the heated gas flowing in from the direction rotating opposite the spirally ascending air current (left side viewed from the feed pipe 22 side in the figure) produces negative pressure at the part of the perforated plate 20 near the connecting part of the feed pipe 22, resulting in the phenomenon whereby gas inside the drying chamber 2b is suctioned in reverse through the blow holes 16 to the hot air chamber 21a side due to an ejector effect. The suctioned gas results in the so-called particle leakage phenomenon, wherein particulates in the drying chamber 2b are blown out, albeit in small amounts, to the hot air chamber side 21a. The particulates blown out to the hot air chamber 21a side travel into the hot air chamber 21a with the heated gas that is continuously supplied, and are kept in locations where this heated gas collides (in FIG. 2, the connecting part of the particulate feed pipe 23 described below, since the heated gas flowing in from the right side is blown out to the drying chamber 2b) with heated gas flowing in from the direction rotating in the same direction as the spirally ascending air current. The particulates trapped in this manner have no place to go, and the amount increases over time. Between the parts of the perforated plate 20 where the particulates are blown out and the parts where the particulates remain, even when no particulates are blown out, particulates in the drying chamber 2b occasionally circulate to the hot air chamber 21a side and adhere to the outer peripheral wall surface of the perforated plate 20. Particulates which thus adhere to and accumulate on the outer peripheral wall surface parts of the perforated plate 20 clog the blow holes 16 formed in the perforated plate 20.

In contrast, in cases where the feed pipe 22 is connected to the wall surface of the container 21 from roughly the tangential direction in the same rotating direction as the spirally ascending air current formed in the cylindrical container 1, as shown in FIG. 8, the heated gas introduced from the feed pipe 22 flows in a constant direction (the same rotating direction as the spirally ascending air current) into the hot air chamber 21a, and is uniformly and smoothly blown from the openings 18 of the blow holes 16 into the drying chamber 2b. No particle leakage thus occurs.

For the same reasons as those described above, the feed pipe 4 through which heated gas is fed into the hot air chamber 2a is preferably connected to the side surface of the hot air chamber 2a from a roughly tangential direction in the same rotating direction as the spirally ascending air current formed in the cylindrical container 1, in the same manner as in the case of the feed pipe 22 described above.

A feed pipe 23 through which the wet particulates being treated are supplied into the drying chamber 2b is connected to the side surface of the container 21 through the perforated plate 20 on the inside and the container 21, as shown in FIG. 1. A particulate constant rate feeder 24 such as the screw conveyor depicted in FIG. 3 is connected to the feed pipe 23. The particulate constant rate feeder 24 is preferably a feeder which is air-tight but in which the machine pressure balance is maintained by the supply blower 7 described above and the discharge blower 28 described below, so as to prevent the heated gas inside the drying chamber 2b from being blown out from the feeder 24 through the feed pipe 23 to the outside or conversely the outside air from being suctioned in from the feeder 24 into the drying chamber 2b.

A discharge pipe 25 is connected in a tangential direction in the same rotating direction as the spirally ascending air current formed inside the cylindrical container 1 to the side wall at the top of the cylindrical container 1. The discharge pipe 25 is connected to a discharge blower 28 through a cyclone or other such particulate separator 26 and piping 27 as shown in FIG. 3.

The discharge pipe 25 need not necessarily be connected from a tangential direction to the cylindrical container 1 as described above, and may be connected from above in the central axial direction of the container 1 to the top (top end surface) of the container 1. In the cylindrical container 1 described above, where D is the diameter, and L is the length of the drying chamber 2b from the perforated plate 3 to the top end surface, L is preferably 2D to 10D, and even more preferably 3D to 6D.

When the outer peripheral wall surface of the drying chamber 2b is enclosed by a jacket, as shown in FIG. 1, and a heat medium such as hot water or heated steam is continuously supplied through a pipe 31 into the space 30 formed between the jacket 29 and outer peripheral wall surface and discharged through a pipe 32 (the above is for cases of hot water, whereas in the case of heated steam, the up and down directions of the supply and discharge pipes are reversed), particulates can be dried by means of the heat transfer by conduction of the heat medium in the wall surface of the drying chamber 2b, and at least the wall surface of the drying chamber 2b can be heated.

As shown in FIG. 3, furthermore, the cylindrical container 1 is divided into a drying chamber 2b and a hot air chamber 2a directly below the perforated plate 3, the drying chamber 2b is also divided directly above the perforated plate 20 and directly below the connecting part of the discharge pipe 25, and the drying chamber 2b therebetween may also be divided into roughly equal lengths in the axial direction as needed. The apparatus is easily assembled and disassembled when the container is constructed of units comprising divided parts enclosed by a jacket 29, flanges are provided at the open end surfaces of the units, and the flanges are detachably joined face-to-face with a clamp or the like. The interior of the container can also be completely cleaned. The length of the drying chamber 2b can also be shortened or conversely lengthened as needed.

A method for drying particulates using the apparatus of the present invention constructed in the foregoing manner is described next.

First, air that has been cleaned by the air filter 5 and heated by the air heater 6 is supplied by the operation of a supply blower 7 through feed pipes 4 and 22 to the hot air chambers 2a and 21a. The same amount of heated gas as that supplied to the hot air chambers 2a and 21a is suctioned and discharged from the drying chamber 2b through the discharge pipe 25, particulate separator 26, and piping 27.

Hot water heated to a constant temperature is continuously supplied through the pipe 31 into the space formed between the outer peripheral wall surface of the drying chamber 2b and the jacket 29 to heat the wall surface of the drying room 2b.

The heated gas supplied to the hot air chamber 2a is blown from the blow holes 16 of the perforated plate 3 into the drying chamber 2b to form a rapid spirally ascending air current on the perforated plate 3. Meanwhile, the heated gas supplied to the hot air chamber 21a is blown from the blow holes 16 of the perforated plate 20 into the drying chamber 2b, forming a rapidly spiraling air current in the peripheral direction along the perforated plate 20. Both heated gases ascend while spiraling along the wall surface of the drying chamber 2b and are discharged outside the system from the discharge pipe 25 through the particulate separator 26 and piping 27 from the discharge blower 28.

The amount and proportion of the heated gases blown from the perforated plate 3 and perforated plate 20 into the drying chamber 2b can be controlled by valves 33 and 34 located in the middle of the heated gas feed tubes 4 and 22 and the valve 35 located in the middle of the piping 27.

After the temperature inside the drying chamber 2b has reached the prescribed level and the spirally ascending air current created by the heated gas has stabilized, the constant rate feeder 24 is actuated, and particulates are supplied in a constant amount from the particulate feed pipe 23 into the drying chamber 2b.

The particulates supplied into the drying chamber 2b are instantaneously dispersed forcibly by the heated gas rapidly spiraling in the peripheral direction along the perforated plate 20, and are borne by the spiraling ascending air current formed by the heated gas inside the drying chamber 2b.

At this time, the particulates that have been supplied spiral vigorously along the perforated plate 20 under the centrifugal force of the spiraling ascending air current. However, because the heated gas is continuously blown from the perforated plate 20, the particulates are not forced against the perforated plate 20. As a result, the particulates do not adhere to and accumulate on the inner peripheral wall surface (perforated plate 20) of the container 1, even when the particulates have a high moisture content immediately after being supplied into the drying chamber 2b and are thus in a state most likely to adhere to the inner peripheral wall surface. If by some chance the particulates do come into contact with the wall surface and adhere thereon, since heated gas is continuously being blown in parallel to the surface of the perforated plate 20 from the blow holes 16 of the perforated plate, the particulates can be blown off immediately after adhering thereon. Since heated gas is similarly blown out continuously from the perforated plate 3 serving as the bottom wall of the drying chamber 2b, no particulates adhere to and accumulate on the bottom wall of the drying chamber 2b.

While they are wet and have high density, the particulates borne on the spirally ascending air current remain circling in virtually the same horizontal plane because of the strong centrifugal force from the spirally ascending air current and the action of gravity, allowing the particulates to be dried by the thermal energy of the heated gas.

At this time, the surface area, configuration, and opening ratio of the openings 18 of the blow holes 16 of the perforated plate 20 are constant in all locations, and even though the flow rate of the heated gas blown from all blow holes 16 is uniform, the flow rate of the spirally ascending air current near the perforated plate 20 gradually builds up in the upward direction, increasing toward the upper side in the axial direction. Due to the resistance caused by the resident particulates, it is difficult for the heated gas to be blown out from the blow holes 16 of the perforated plate 20 (same peripheral surface of parts where particulate feed pipe 23 is connected) located in the bottom part where the wet, high density particulates are trapped while circulating. As a result, the flow rate of the heated gas blown from the blow holes 16 at the top is actually greater than this, and the blowing rate is faster. A so-called air ring is formed in this part, and this air ring has the same effect on particulates supplied into the drying chamber 2b as if a partitioning ring with a circular opening in the center were attached from the side wall of the drying chamber 2b, thereby preventing the particulates from traveling upward along with the ascending air current.

Because of the decrease in centrifugal force produced from the spirally ascending air current and the action of gravity, and because of the continuous supply of particulates from the particulate feed pipe 23, the particulates which have been supplied earlier and have become lighter upon being dried travel in the direction of the center and travel upward inside the drying chamber 2b along with the ascending air current while spiraling through the opening of the air ring created by the spiraling ascending air current. The particulates are discharged through the discharge pipe 25, separated from the air current by the particulate separator 26, and recovered in the form of dry particulates.

Although the perforated plate 20 cannot be clearly delineated into a part where the particulates are prevented from coming into direct contact with the inner peripheral wall surface of the cylindrical container 1 (adhesion prevention zones) and a part where the particulates are prevented from traveling upward (travel prevention zones), if the perforated plate is divided into these two zones for the sake of simplicity, the perforated plate serving as the travel prevention zone need not necessarily be connected directly over the perforated plate serving as the adhesion prevention zone. That is, there may be parts where no perforated plate exists at a constant width in the axial direction between the two zones of the cylindrical container 1.

The particulates which are treated by the foregoing drying method may be used with various types of inert gases, such as nitrogen, as the heated gas instead of air in cases where various types of organic solvents are used or in cases where there is a danger of ignition or explosion due to the physical properties or the like of the particulates. In such cases, the particulates may be dried by connecting the piping at the outlet of the discharge blower 28, for example, via a solvent recovery device (not shown in figure) to the air heater 6, and by forming a closed circuit to displace the interior of the closed circuit with an inert gas.

A second embodiment of the device pertaining to the present invention is described below with reference to FIGS. 9 and 10.

Parts which are the same as those in the apparatus in the first embodiment of the apparatus pertaining to the present invention are designated by the same symbols and will not be further described.

Figure 9:
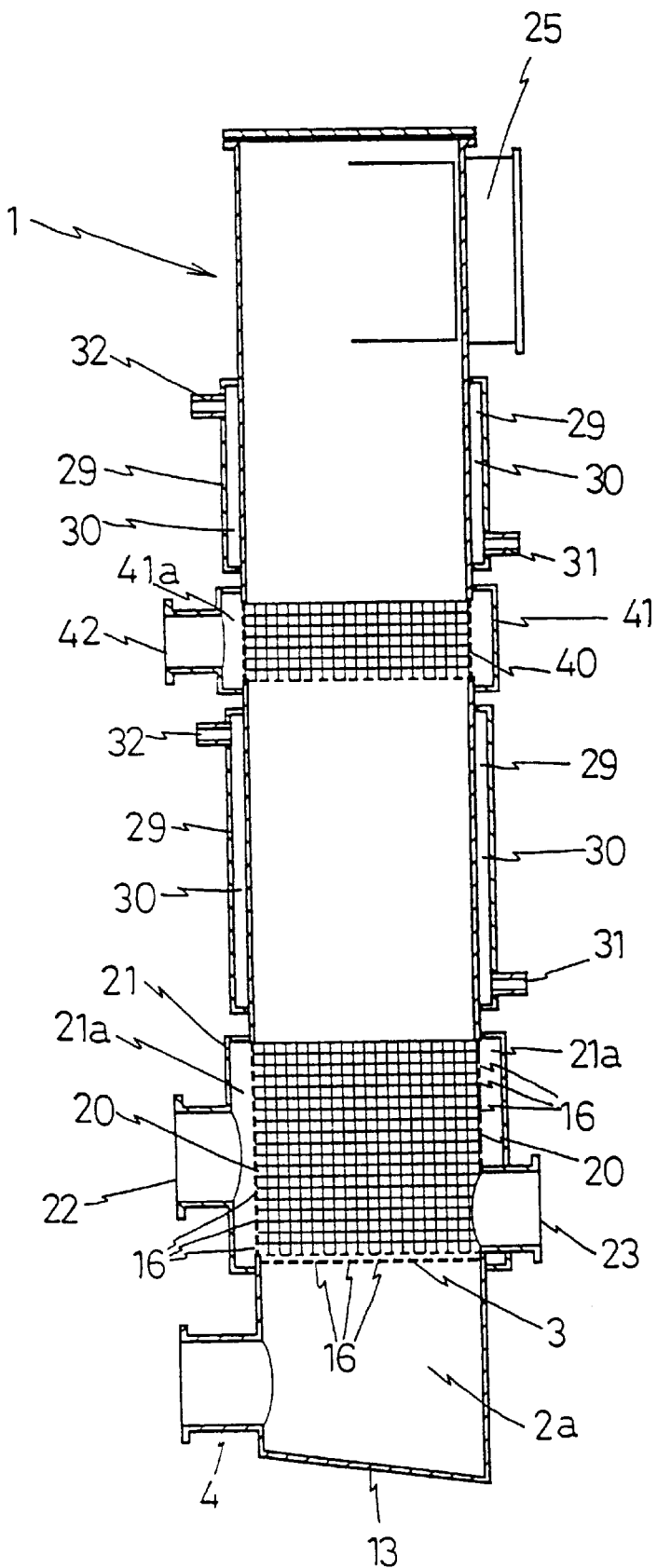
FIG. 9 is a vertical cross section of a second embodiment of the apparatus of the present invention.

As shown in FIG. 9, the apparatus in the second embodiment of the present invention is an apparatus in which a perforated plate 40 similar to that described above (a perforated plate in which the same type of blow holes 16 as in FIGS. 4 and 5 or long slits are formed, and the openings 18 of the blow holes 16 are arranged systematically facing in a tangential direction of the container 1 in the same manner as in the case of the perforated plate 20) is provided along the entire periphery at a constant width on a part of the inner peripheral wall surface of the drying chamber 2b located below the discharge pipe 25. The entire breadth of the entire periphery of the perforated plate 40 is completely enclosed by a container 41 in the same manner as described above, and a hot air chamber 41a is formed between the container 41 and perforated plate 40. The structure of the device is thus such that a heated gas feed pipe 42 is connected to the side surface of the hot air chamber 41a. The other parts are the same as the apparatus in the first embodiment of the present invention described above.

The heated gas feed pipe 42 described above is also preferably connected to the container 41 from a roughly tangential direction in the same rotating direction as the spirally ascending air current formed in the cylindrical container 1 in the same manner as in the heated gas feed pipes 4 and 22 described above.

In the apparatus described above, the particulates that are supplied through the feed pipe 23 into the drying chamber 2b are forcibly dispersed and dried by the heated gas rapidly spiraling in the peripheral direction along the perforated plate 20 in the same manner as in the apparatus in the first embodiment described above. While the particulates are wet and have high density, they remain circling in virtually the same horizontal plane because of the strong centrifugal force from the spirally ascending air current and the action of gravity, allowing the particulates to be dried by the thermal energy of the heated gas. Because of the decrease in centrifugal force produced from the spirally ascending air current and the action of gravity, and because of the continuous supply of particulates from the particulate feed pipe 23, the particulates which subsequently dry and become lighter travel in the direction of the center and travel while spiraling upward. The particulates thus reach the location where the perforated plate 40 described above has been provided.

At the location where the perforated plate 40 has been provided, heated gas is introduced through the feed pipe 42 into the hot air chamber 41a, and heated gas is blown from the perforated plate 40 into the drying chamber 2b. A rapidly spiraling air current, that is, the air ring described above, is thus formed in the peripheral direction along the perforated plate 40 in this part. The air ring has the effect of blocking particulates that have traveled spiraling upward along the inner wall of the cylindrical container 1. The particulates which have been prevented from traveling upward remain circling at the bottom of the air ring and are effectively dried by means of the thermal energy of the heated gas and by means of the heat transfer by conduction from the heat medium when a heat medium is supplied into the space 30 between the outer peripheral wall surface. Because of the decrease in centrifugal force produced from the spirally ascending air current, the particulates which subsequently dry and become lighter again travel in the direction of the center and are discharged from the discharge pipe 25 along with the spirally ascending air current through the opening formed in the center of the air ring. The particulates discharged from the discharge pipe 25 are separated from the air current by the particulate separator 26 and are recovered in the form of thoroughly dried particulates.

Figure 10:
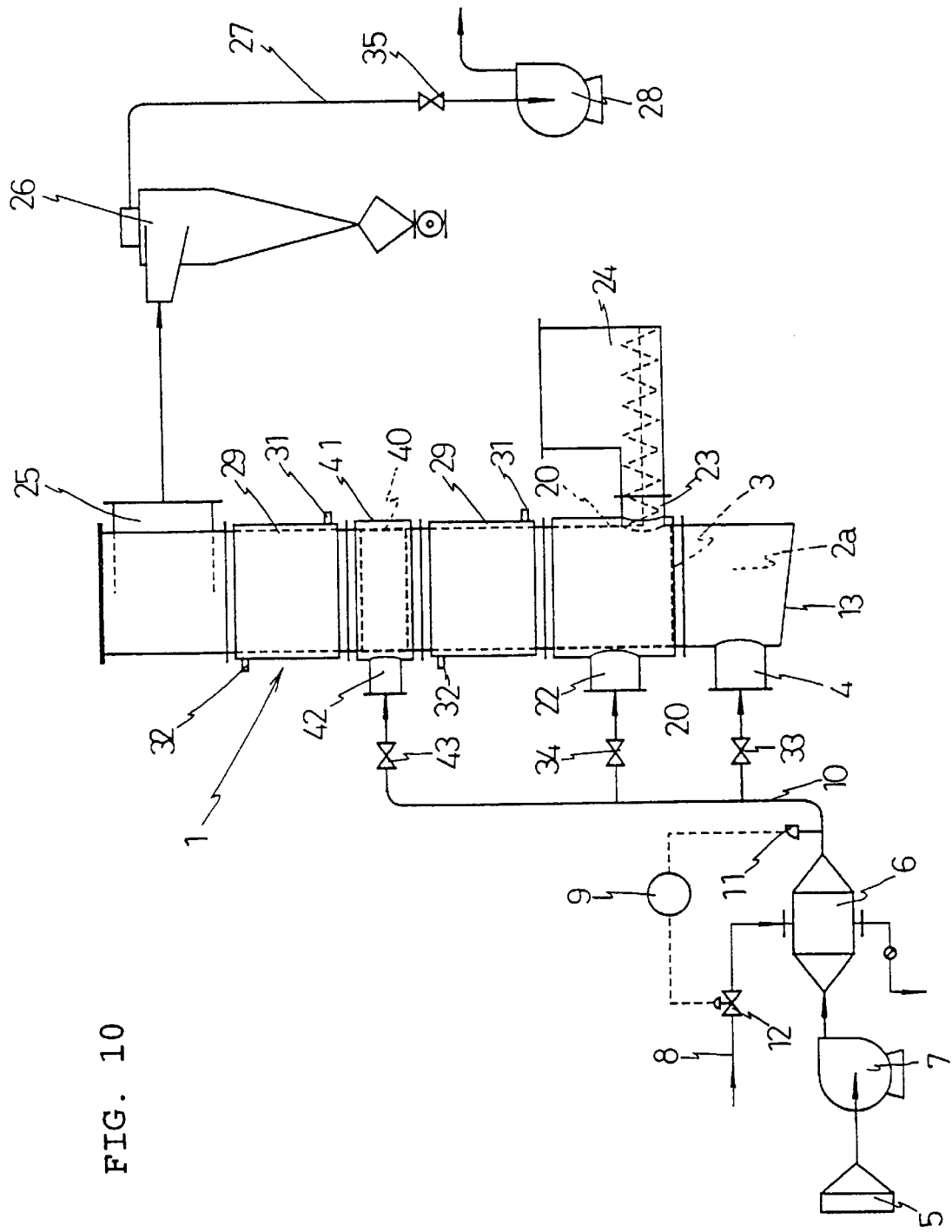
FIG. 10 depicts the second embodiment of the apparatus of the present invention along with devices that are needed before and after it.

In the apparatus described above, heated gas blown from the perforated plate 40 is controlled (the valve 43 provided in the middle of the feed pipe 42 shown in FIG. 10 is opened or closed, and the flow rate is adjusted), allowing the particulate behavior (residence time) to be controlled, that is, allowing the particulates to be kept in that location, to be released (along with the ascending air current), and the like. Two or more structures constituting the air ring can be set up at intervals in the central axial direction, and can be operated and controlled in the same manner as above.

Figure 11:
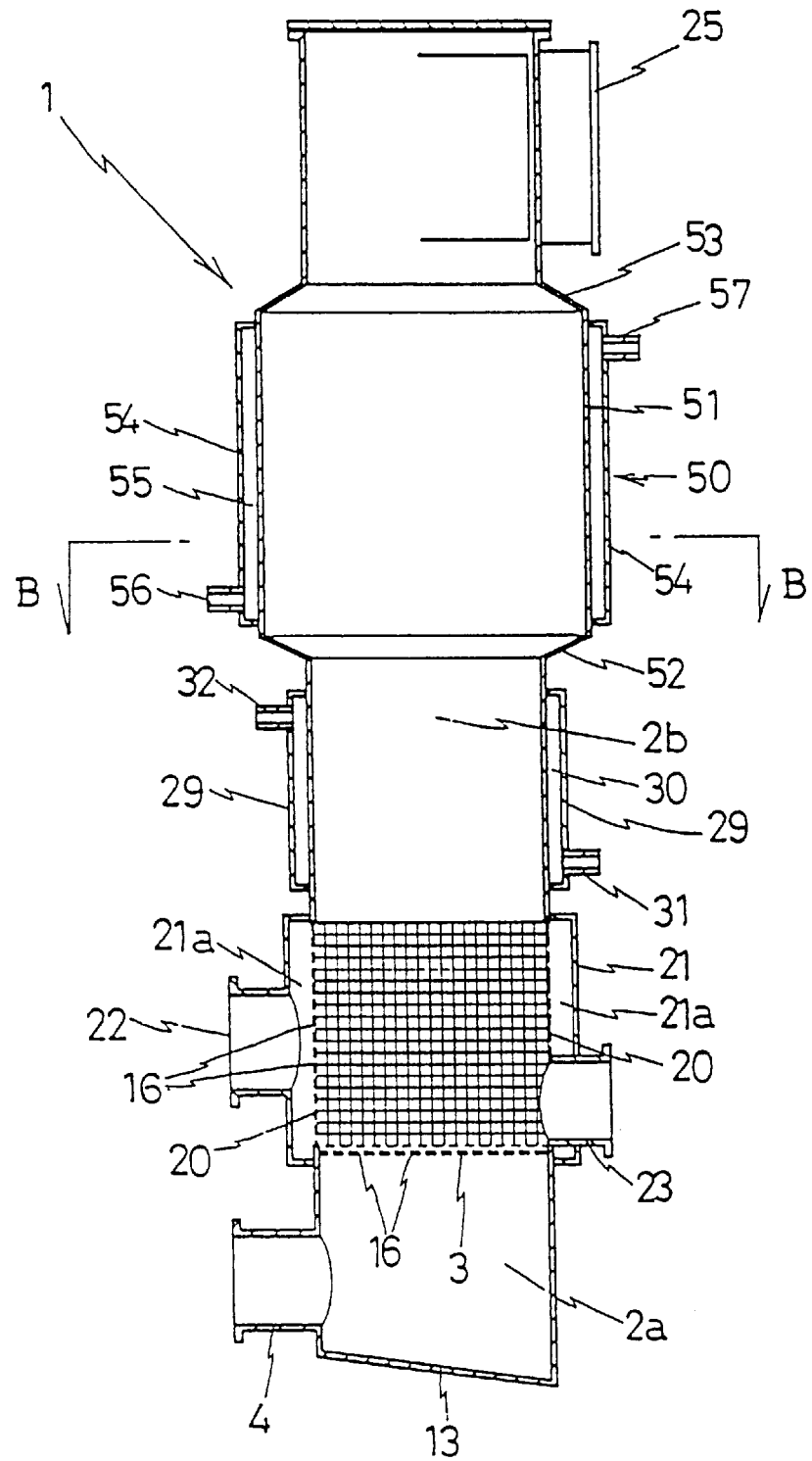
FIG. 11 is a vertical cross section of a third embodiment of the apparatus pertaining to the present invention.
Figure 12:
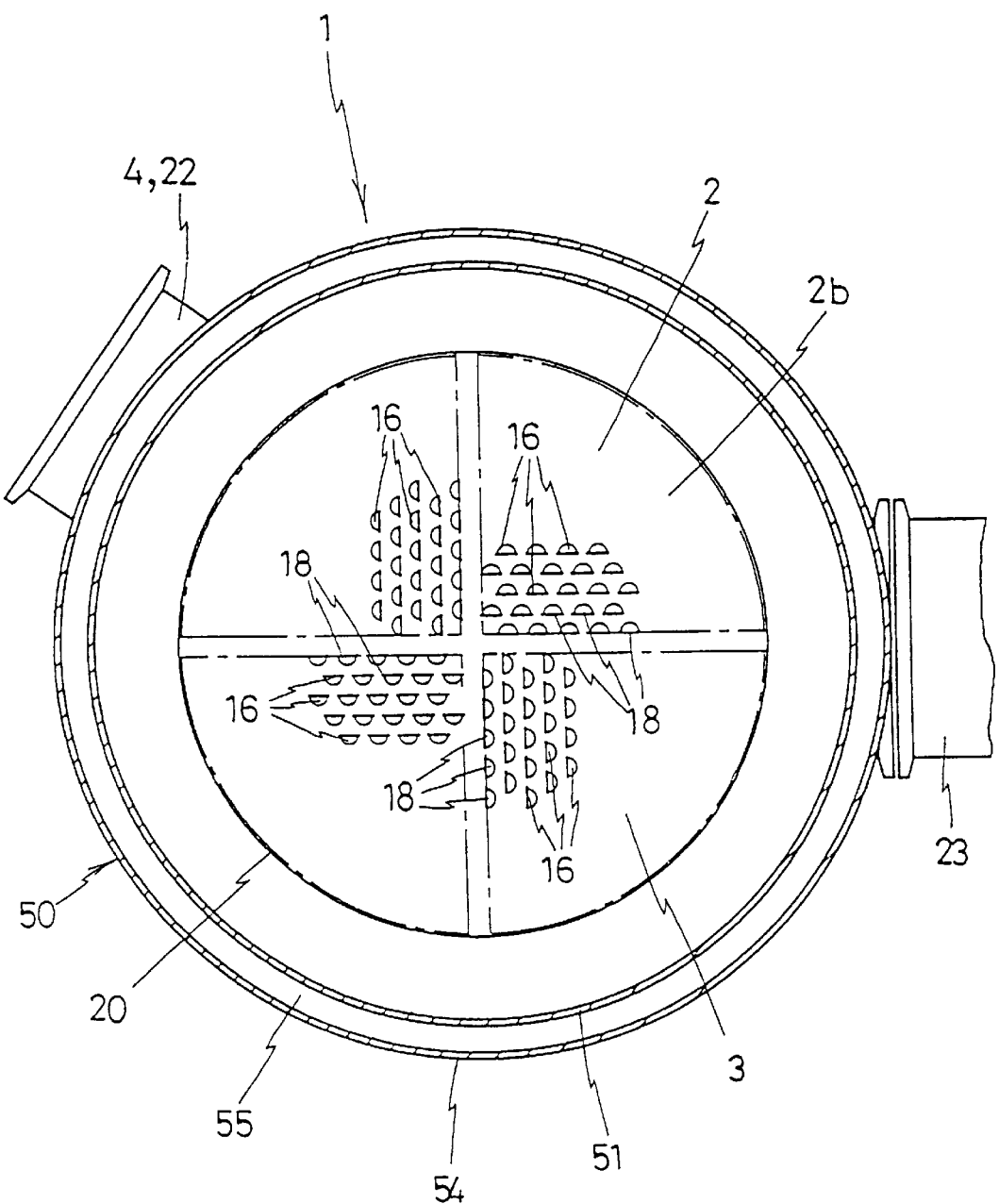
FIG. 12 is an enlarged cross section of the part along line B—B in FIG. 11.

A third embodiment of the device pertaining to the present invention is described below with reference to FIGS. 11 through 13.

In this embodiment, parts which are the same as those in the apparatus in the first embodiment of the apparatus pertaining to the present invention described above are designated by the same symbols and will not be further described.

The apparatus in the third embodiment is one in which part of the drying chamber 2b located under the discharge pipe 25 described above is formed into a drying chamber such that the horizontal cross section is in the form of concentric circles that are wider than the other parts (hereinafter, widened drying chamber 50). The other parts are the same as those of the first embodiment of the apparatus pertaining to the present invention described above.

Specifically, the widened drying chamber 50 described above has a structure in which a cylindrical member 51 having a large inside diameter is connected via truncated cone members 52 and 53 to a part of the cylindrical container 1 as shown in the figures, for example.

This apparatus preferably has a structure in which the outer peripheral wall surface of the widened drying chamber 50 described above is enclosed by a jacket 54, and a heat medium such as hot water or heated steam is supplied continuously through a pipe 56 into the space formed between the jacket 54 and outer peripheral wall surface, and is discharged from a pipe 57 (the above is for cases of hot water, whereas in the case of heated steam, the up and down directions of the supply and discharge pipes are reversed), allowing the particulate drying conditions to be even further improved.

Figure 13:
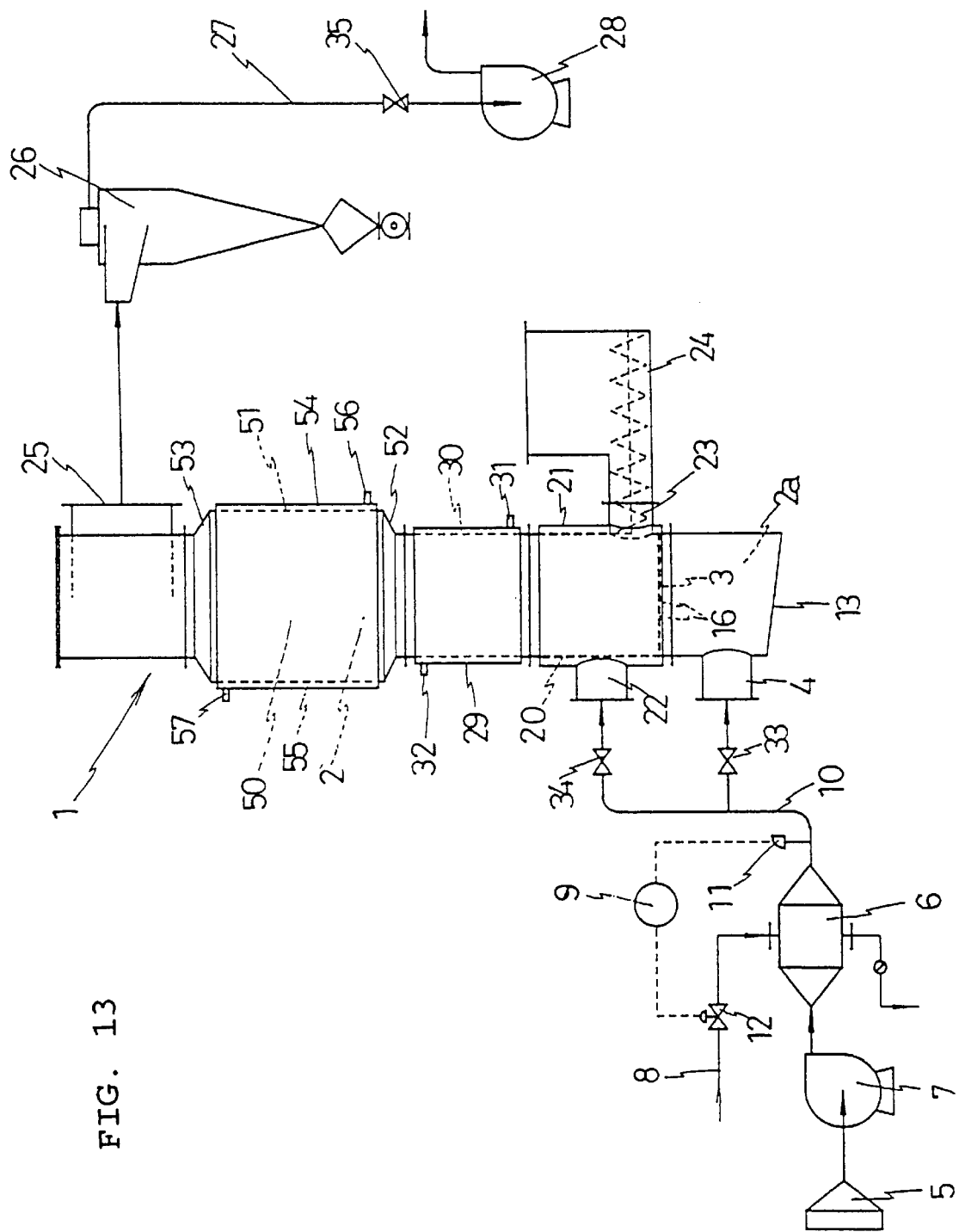
FIG. 13 depicts the third embodiment of the apparatus pertaining to the present invention along with the devices that are needed before and after it.

As shown in FIG. 13, the cylindrical container 1 is divided into upper and lower parts of the widened drying chamber 50 described above, and the parts of the other drying chamber 2b are also divided into virtually the same lengths in the axial direction as needed. When composed of units with flanges provided at the open end surfaces of the divided parts, the parts can be readily joined with clamps or the like in the same manner as the apparatus in the first embodiment, affording the same effects as that apparatus.

The widened drying chamber 50 can be readily replaced, depending on the particulate properties, the target moisture content, and the like, by preparing a plurality of units in which the cylindrical member 51 comprising the widened drying chamber 50 has varying inside diameters. A plurality of units having a widened drying chamber 50 can be connected to prolong the particulate residence time.

The section area of the widened drying chamber 50 described above should be 1.1 to 3.0 times, and preferably 1.1 to 2.0 times, greater than that of the other drying chamber 2b.

This is because a drying chamber 50 with a section area less than 1.1 times greater has little effect in prolonging the particulate residence time. When the drying chamber 50 is more than 3 times greater, on the other hand, the flow rate of the spirally ascending air current in the widened drying chamber 50 is markedly slower, depending on the flow rate (flow speed) of the heated gas being supplied, and neither sufficient centrifugal force for causing the particulates to travel in a spiral nor ascending force for causing the particulates to travel upward can be provided.

In the apparatus described above, the rate at which the spirally ascending air current ascends in the widened drying chamber 50 is markedly lower, allowing the particulates to remain rotating once again in virtually the same horizontal plane similar to the effects obtained when an air ring is formed in the apparatus in the second embodiment described above. The particulates thus staying are effectively dried by means of the thermal energy of the heated gas and by means of the heat transfer by conduction from the heat medium when a heat medium is supplied into the space 55 between the outer peripheral wall surface. Because of the decrease in centrifugal force produced from the spirally ascending air current, the particulates which dry and become lighter again travel in the direction of the center and are discharged from the discharge pipe 25 along with the spirally ascending air current. The particulates discharged from the discharge pipe 25 are separated from the air current by the particulate separator 26 and are recovered in the form of thoroughly dried particulates.

A fourth embodiment of the device pertaining to the present invention is described below with reference to FIG. 14. In this embodiment, parts which are the same as those in the apparatus in the first and third embodiments of the apparatus pertaining to the present invention described above are designated by the same symbols and will not be further described.

The apparatus in the fourth embodiment is one in which a mechanism 60 for blowing heated gas (low humidity secondary air) is formed at the bottom of the widened drying chamber 50 of the apparatus in the third embodiment described above. The other parts are the same as those in the apparatus in the third embodiment of the present invention.

Figure 14:
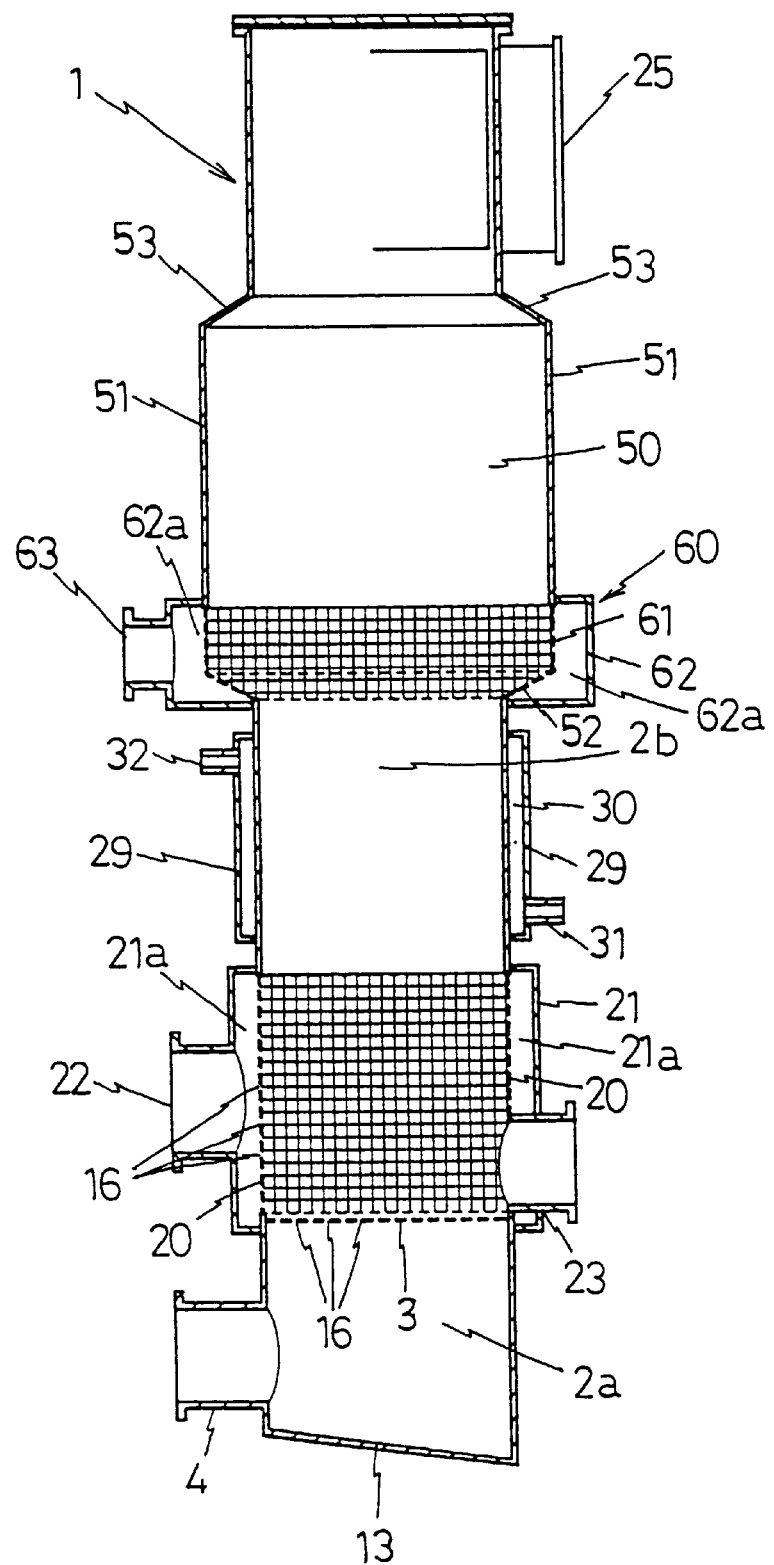
FIG. 14 is a vertical cross section of a fourth embodiment of the apparatus pertaining to the present invention.

Specifically, as shown in FIG. 14, the apparatus has a structure in which the same type of perforated plate 61 as that described above (a perforated plate in which the same type of blow holes 16 as in FIGS. 4 and 5 or long slits are formed, and the openings 18 of the blow holes 16 are arranged systematically facing in a tangential direction of the container 1 in the same manner as in the case of the perforated plate 20) is provided at a constant width along part or all of the side surface of the bottom of the widened drying chamber 50 and the part connecting the bottom part and the drying chamber 2b located under it. The entire breadth of the entire periphery of the perforated plate 61 is completely enclosed by a container 62 in the same manner as described above, and a hot air chamber 62a (air current reservoir) is formed between the container 62 and perforated plate 61. The structure of the device is thus such that a heated gas feed pipe 63 is connected to the side surface of the hot air chamber 62a.

The heated gas feed pipe 63 described above is also preferably connected to the container 62 from a roughly tangential direction in the same rotating direction as the spirally ascending air current formed in the cylindrical container 1 in the same manner as in the heated gas feed pipes 4, 22, and 42 described above.

In the apparatus described above, heated gas is supplied through the feed pipe 63 into the hot air chamber 62a, and low humidity heated gas (secondary air) can be blown from the perforated plate 61 into the widened drying chamber 50. As a result, the particulates that spiral upward and reach the widened drying chamber 50 circle in the same place at the bottom of the widened drying chamber 50 and the connection part underneath because of the rapid decrease in the rate at which the spirally ascending air current ascends in this location. The particulates are more effectively dried (finished drying) by the thermal energy of the ascending air current and the thermal energy of the heated gas blown in from the perforated plate 61. Because of the decrease in centrifugal force produced from the spirally ascending air current, the particulates which dry and become lighter once again travel in the direction of the center and are discharged through the discharge pipe 25 along with the spirally ascending air current. The particulates discharged from the discharge pipe 25 are separated from the air current by the particulate separator 26 and are recovered in the form of thoroughly dried particulates.

A fifth embodiment of the device pertaining to the present invention is described below with reference to FIG. 15. In this embodiment, parts which are the same as those in the apparatus in the first and third embodiments of the apparatus pertaining to the present invention described above are designated by the same symbols and will not be further described.

The apparatus in the fifth embodiment is one which can be used effectively when the particulates being treated are materials with relatively low adhesion. This apparatus has a structure in which the perforated plate 20 of the apparatus in the third embodiment described above is at a distance from the perforated plate 3 present underneath. The other parts are the same as in the apparatus in the third embodiment of the present invention described above.

Figure 15:
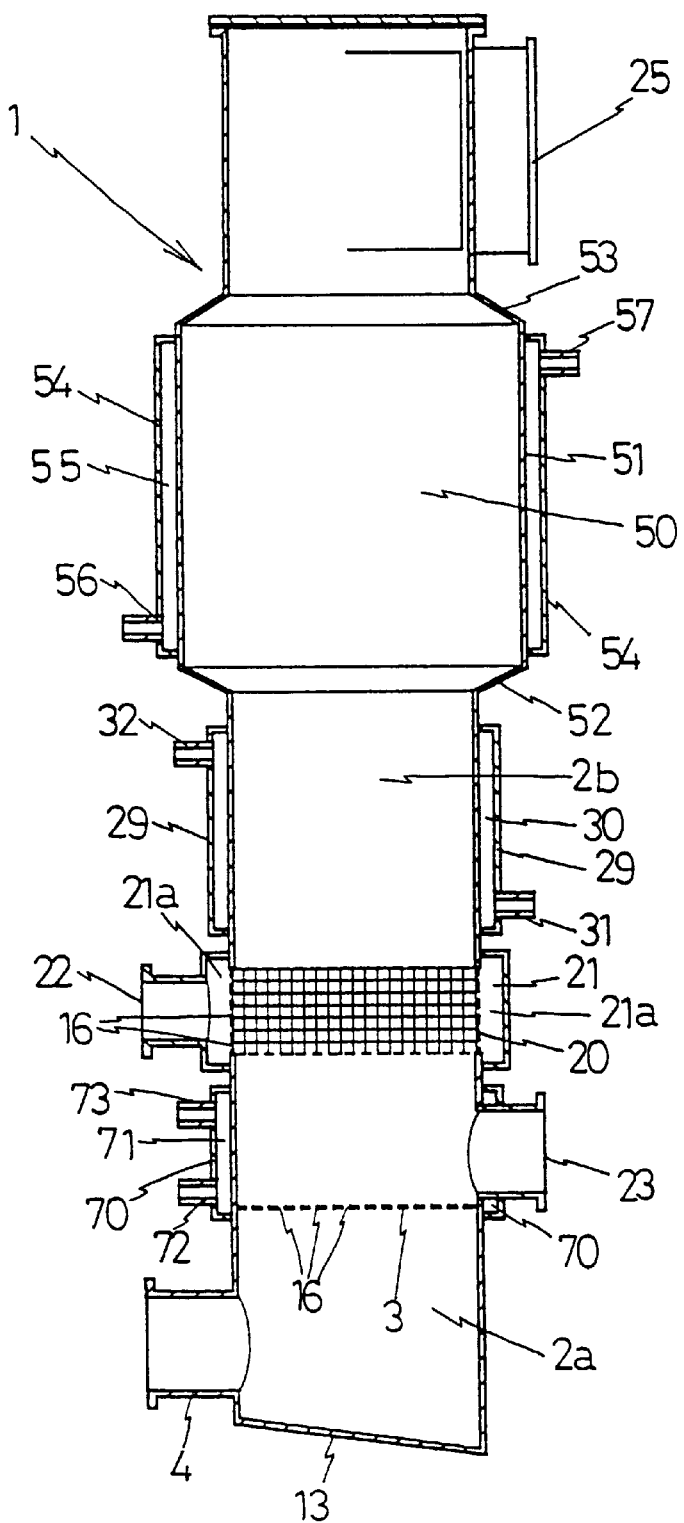
FIG. 15 is a vertical cross section of a fifth embodiment of the apparatus pertaining to the present invention.

Specifically, as shown in FIG. 15, the perforated plate 20 in which blow holes 16 are formed is arranged on the side wall of the drying chamber 2b to which the particulate feed tube 2 is connected. The outer peripheral wall surface of the drying chamber 2b between the perforated plate 3 and the peripheral surface at the bottom of the perforated plate 20 is enclosed by a jacket 70, as shown in the figure, and a heat medium such as hot water or heated steam is continuously supplied through a pipe 72 into the space 71 formed between the jacket 70 and the outer peripheral wall surface and is discharged through a pipe 73 (the above is for cases of hot water, whereas in the case of heated steam, the up and down directions of the supply and discharge pipes are reversed).

In the apparatus described above, the particulates which have been supplied through the particulate feed pipe 23 into the drying chamber 2b are blown from the blow holes 16 of the perforated plate 3 into the drying chamber 2b, are forcibly dispersed by the heated gas forming the rapid spirally ascending air current on the perforated plate 3, travel upward on the spirally ascending air current, and reach the location where the perforated plate 20 described above is located.

In the location where the perforated plate 20 is set up, heated gas is introduced through the feed pipe 22 into the hot air chamber 21a, and heated gas is blown from the perforated plate 20 into the drying chamber 2b, resulting in the formation of an air current, that is, an air ring, rapidly spiraling in the peripheral direction along the perforated plate 20. The air ring has the effect of impeding wet particles that spiral upward along the inner wall of the cylindrical container 1. The particulates that are prevented from traveling upward stay circling in the bottom of the air ring and are effectively dried by means of the thermal energy of the heated gas and by means of the transfer of heat by conduction from the heat medium supplied into the space 71 between the outer peripheral wall surface. Because of the decrease in centrifugal force produced from the spirally ascending air current, the particulates which dry and become lighter travel in the direction of the center and ascend along with the spirally ascending air current through the opening formed in the center of the air ring. The rest is the same as the apparatus in the third embodiment described above.

Figure 16:
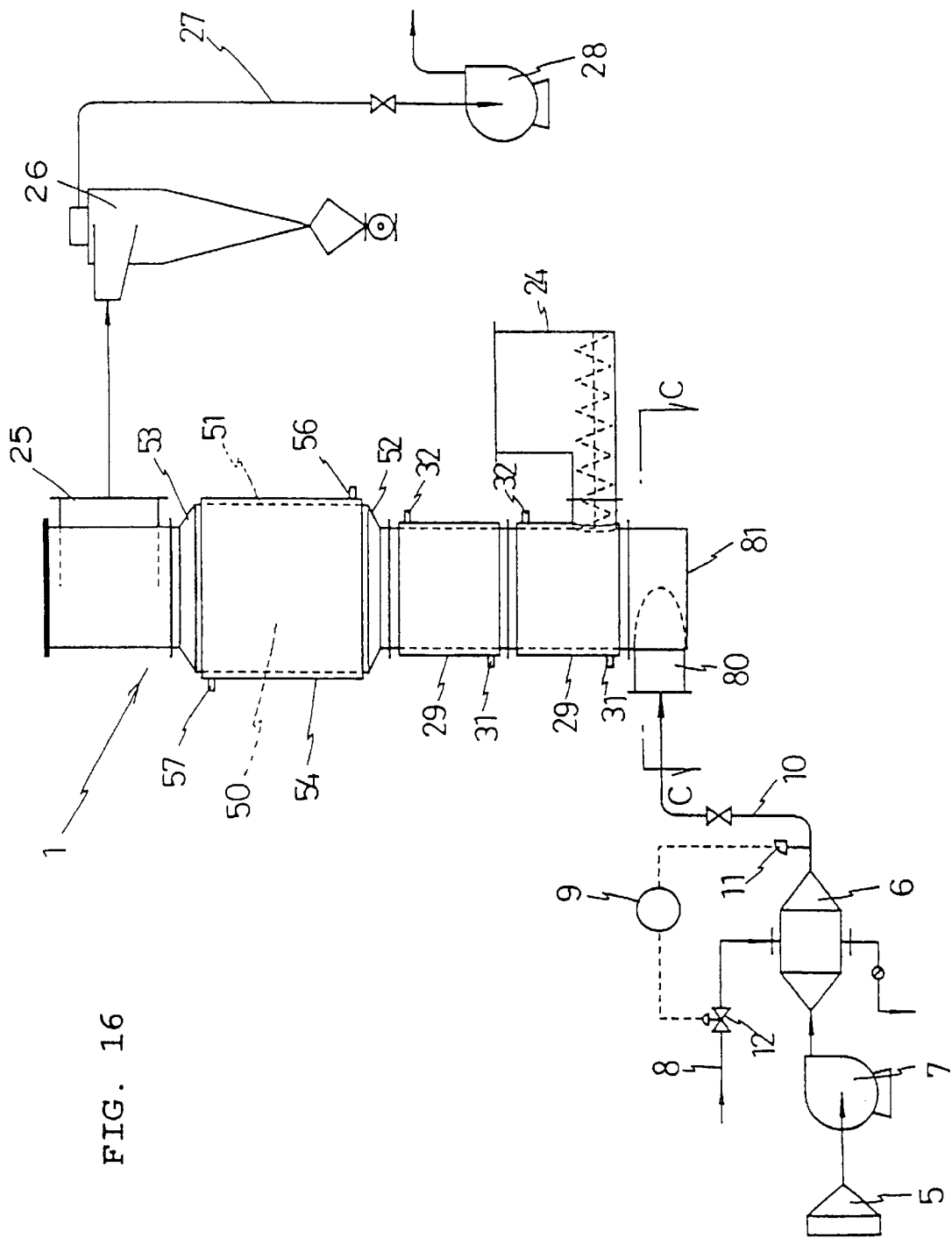
FIG. 16 is a vertical cross section of a sixth embodiment of the apparatus pertaining to the present invention.

A sixth embodiment of the device pertaining to the present invention is described below with reference to FIGS. 16 and 17. In this apparatus, parts which are the same as those in the apparatus in the first and third embodiments of the apparatus pertaining to the present invention described above are designated by the same symbols and will not be further described.

The apparatus in the sixth embodiment is one which can be used effectively when the particulates being treated are materials with relatively low adhesion, as in the case of the apparatus in the fifth embodiment described above.

Figure 17:
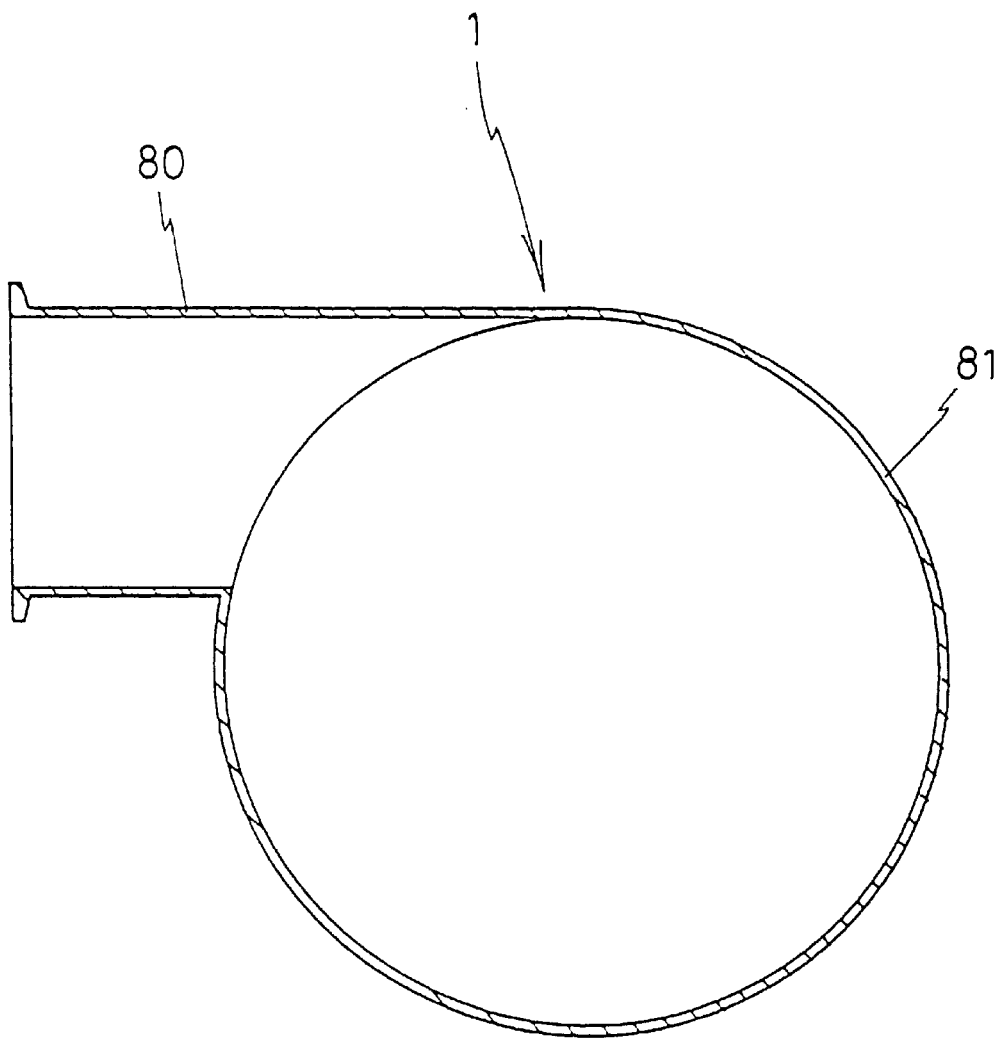
FIG. 17 is an enlarged cross section of the part along line C—C in FIG. 16.

This apparatus has a structure in which the feed pipe 80 through which the heated gas is supplied is connected in a tangential direction to the bottom 81 of the cylindrical container 1 as shown in FIG. 17, and a spirally ascending air current is formed in the cylindrical container 1. The other parts are the same as in the apparatus in the third embodiment of the present invention.

In this apparatus, heated gas fed from a tangential direction through the feed pipe 80 to the bottom 81 of the cylindrical container 1 forms an air current that spirally ascends inside the cylindrical container 1.

As the particulates that are introduced through the feed pipe 23 into the cylindrical container 1 are thus dispersed and dried by the spirally ascending air current created by the heated gas, they spirally ascend along the inner peripheral wall surface of the cylindrical container 1 with the spirally ascending air current, and reach the widened drying chamber 50.

In the widened drying chamber 50, the rate at which the spirally ascending air current ascends is dramatically reduced in the same manner as in the apparatus in the third embodiment described above, and the particulates thus circle in place in roughly the same horizontal plane. The particulates are effectively dried by the thermal energy of the heated gas, and the particulates which subsequently dry and become lighter travel in the direction of the center and are discharged through the discharge pipe 25 along with the spirally ascending air. The particulates discharged from the discharge pipe 25 are separated from the air current by the particulate separator 26 and are recovered in the form of thoroughly dried particulates.

Figure 18:
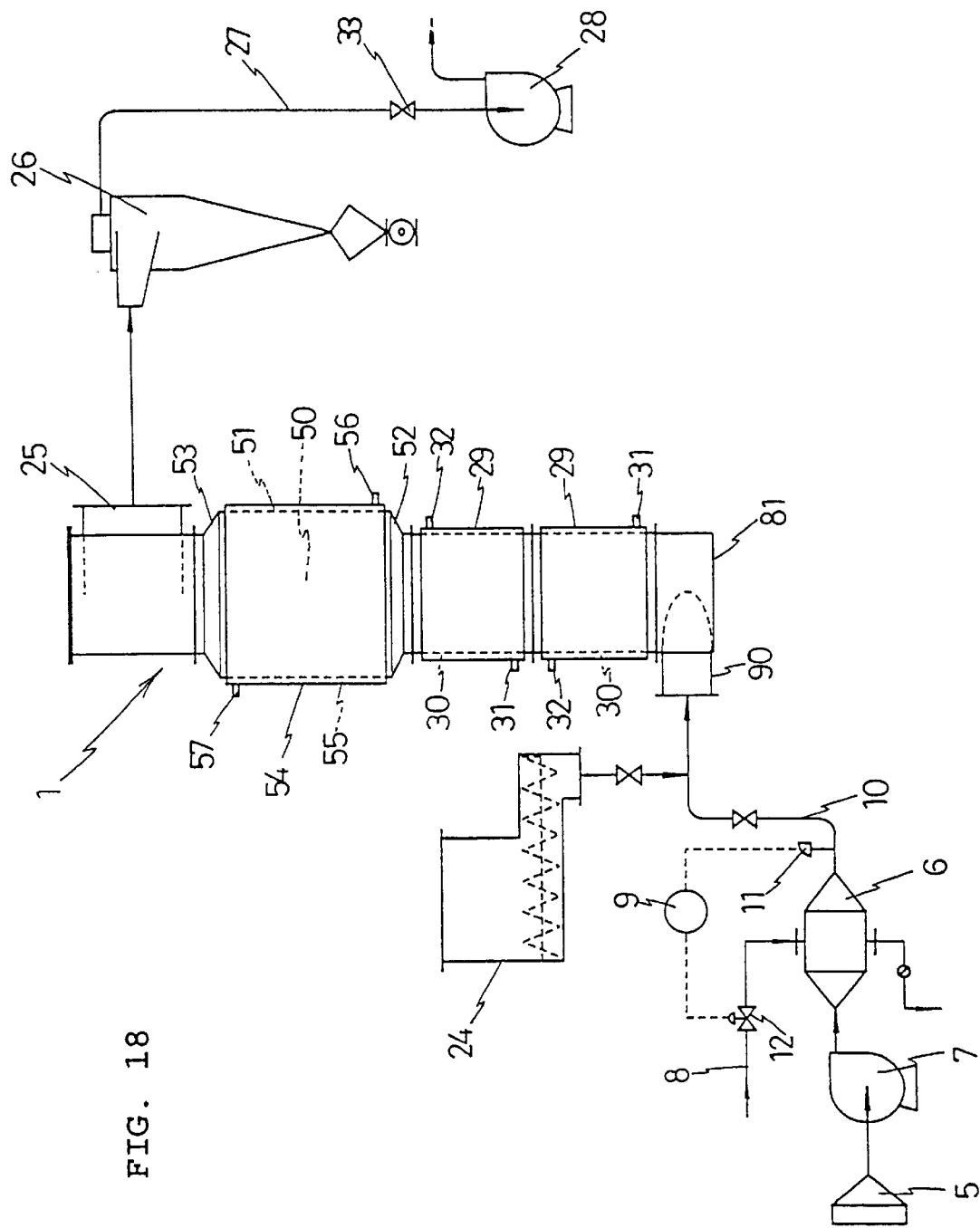
FIG. 18 depicts a seventh embodiment of the apparatus pertaining to the present invention along with the devices that are needed before and after it.

When the feed pipe 80 through which the heated gas is supplied is connected in a tangential direction to the bottom 81 of the cylindrical container as in the apparatus described above, and a mechanism is formed to produce a spirally ascending air current inside the cylindrical container 1, the apparatus may have a structure in which the feed pipe through which the heated gas is supplied serves as a feed pipe 90 doubling as a particulate feed pipe, as in the case of the seventh embodiment depicted in FIG. 18, and the particulates are supplied along with the heated gas through the feed pipe 90 into the cylindrical container 1.

Figure 19:
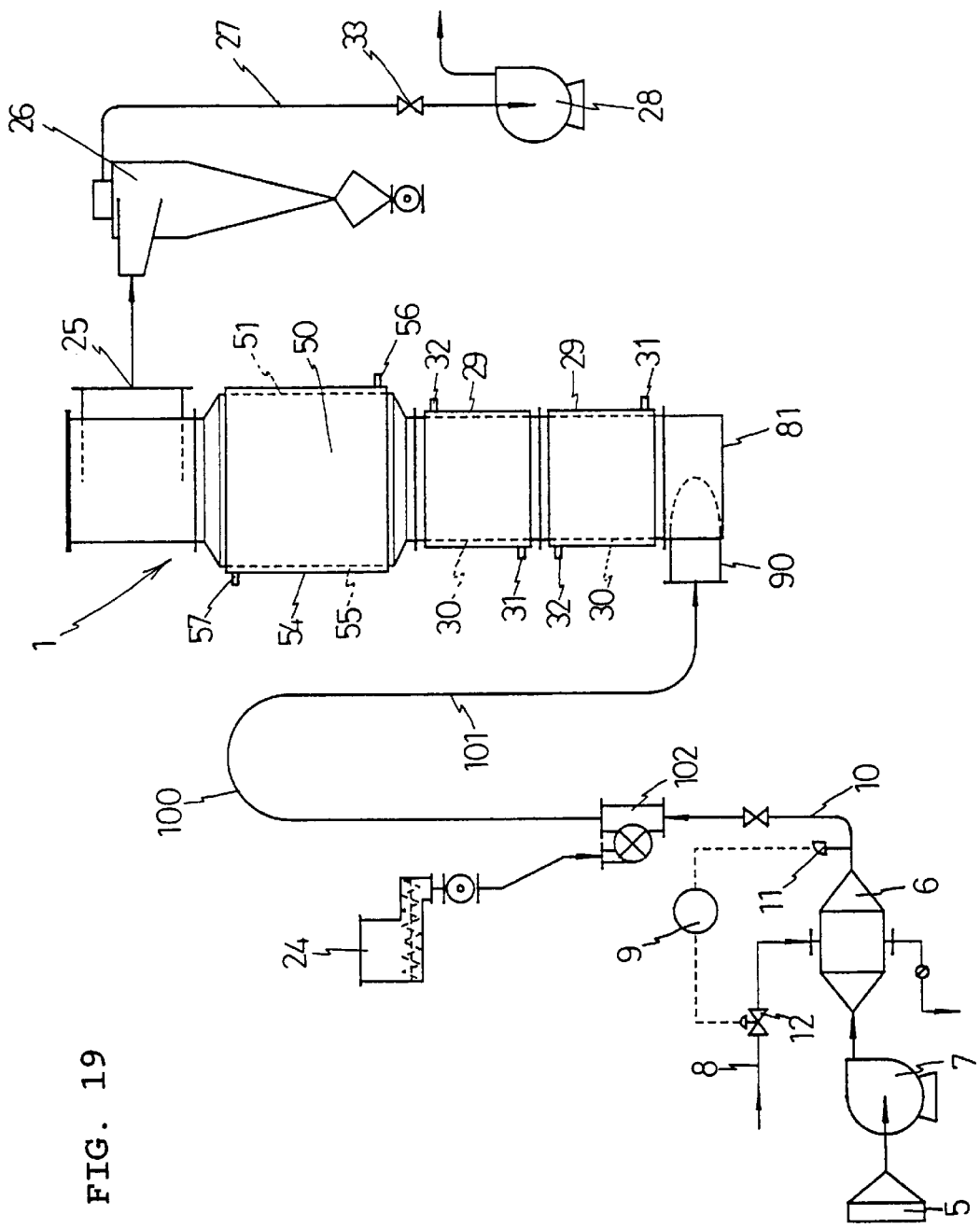
FIG. 19 depicts an eighth embodiment of the apparatus pertaining to the present invention along with the devices that are needed before and after it.

The apparatus may also have a structure in which, as in the case of the eighth embodiment of the apparatus pertaining to the present invention shown in FIG. 19, the outlet side end of a drying pipe 101 of a conventional flash dryer is connected to the feed pipe 90 for both the heated gas and particulates. In this case, the heated gas (exhaust) passing through the conventional flash dryer 100 is converted to a spirally ascending air current in the cylindrical container 1, and the particulates being dried as they are transported in the flow of the air current are subject to the same action as that described above in the cylindrical container 1, allowing the drying performance to be enhanced. That is, the optimal particulate moisture can be lowered at the heated gas temperature and flow rate used in the flash dryer 100, or a greater amount can be treated when the optimal temperature is the same, allowing more efficient drying to be achieved. 102 in FIG. 19 is a beater.

Test examples confirming the effects of the various particulate drying methods and drying apparatus pertaining to the present invention are noted below.

TEST EXAMPLE A

Drying MBS-Based Resin Having Moisture Content of 24% WB (mean particle diameter: 165 $\mu$m; bulk density: 0.5)

TEST EXAMPLE A1

A spirally ascending air current was formed by introducing heated gas and the particulates described above in a tangential direction into a straight pipe having an inside diameter of 250 mm and a length 5 times greater than the inside diameter, and the particulates were dried while borne on the spirally ascending air current (specifically, the particulates were dried using the apparatus depicted in FIG. 18, but with the widened drying chamber 50 removed).

The particulate drying conditions and drying effects are given in Table 1.

TEST EXAMPLE A2

A spirally ascending air current was formed by introducing heated gas from only the perforated plate at the bottom side wall into a straight pipe having an inside diameter of 250 mm and a length 5 times greater than the inside diameter, and the particulates were dried while borne on the spirally ascending air current (specifically, the particulates were dried using the apparatus depicted in FIG. 3, while closing the valve 33 located in the middle of the feed pipe 4 through which the heated gas was introduced into the drying chamber 2a, with a flat plate placed on the perforated plate 3).

The particulate drying conditions and drying effects are given in Table 1.

TEST EXAMPLE A3

A spirally ascending air current was formed by introducing heated gas from the bottom side wall and bottom wall perforated plate into a straight pipe having an inside diameter of 250 mm and a length 5 times greater than the inside diameter, and the particulates were dried while borne on the spirally ascending air current (specifically, the particulates were dried using the apparatus depicted in FIG. 3).

The ratio of the amount of heated gas supplied from the bottom side wall and bottom wall perforated plate into the drying chamber 2b was 4:6.

The other particulate drying conditions and drying effects are given in Table 1.

TEST EXAMPLE A4

A spirally ascending air current was formed by introducing heated gas from the bottom side wall and bottom wall perforated plate into a straight pipe having an inside diameter of 250 mm and a length 5 times greater than the inside diameter, and the particulates were dried while borne on the spirally ascending air current (specifically, the particulates were dried using the apparatus depicted in FIG. 3).

The ratio of the amount of heated gas supplied from the bottom side wall and bottom wall perforated plate into the drying chamber 2b was 7:3.

The other particulate drying conditions and drying effects are given in Table 1.

TEST EXAMPLE A5

A spirally ascending air current was formed by introducing heated gas from the bottom side wall and bottom wall perforated plate into a container having a widened component with an inside diameter of 350 mm and a length of 250 mm midway (at a location 750 mm from the bottom wall) in a straight pipe having an inside diameter of 250 mm and a length 5 times greater than the inside diameter, and the particulates were dried while borne on the spirally ascending air current (specifically, the particulates were dried using the apparatus depicted in FIG. 13).

The ratio of the amount of heated gas supplied from the bottom side wall and bottom wall perforated plate into the drying chamber 2b was 7:3.

The other particulate drying conditions and drying effects are given in Table 1.

on the air current adhered to the vent at the top. The final product had a moisture content of 15% WB.

Test B

Drying MBS-Based Resin Having Moisture Content of 6% WB (specifically, dry particulates obtained in Test Example A5 above)

TEST EXAMPLE B1

A spirally ascending air current was formed by introducing heated gas and the particulates described above in a tangential direction into a straight pipe having an inside diameter of 250 mm and a length 5 times greater than the inside diameter, and the particulates were dried while borne on the spirally ascending air current (specifically, the particulates were dried using the apparatus depicted in FIG. 18, but with the widened drying chamber 50 removed).

The particulate drying conditions and drying effects are given in Table 2.

TEST EXAMPLE B2

A spirally ascending air current was formed by introducing heated gas from the bottom side wall and bottom wall

TABLE 1

| | Particulate | Heated gas | | | | | Solid | Mfg. product | |
|---|---|---|---|---|---|---|---|---|---|
| | amount fed (kg/hr) | Superficial velocity (m/sec) | Flow Rate (m³/min) | Weight (kg/hr) | Inlet temp. (° C.) | Outlet temp. (° C.) | air ratio (—) | moisture content (% WB) | Adhesion |
| Test Example A1 | 50 | 6.0 | 16.6 | 890 | 110 | 83 | 0.056 | — | X (note 1) |
| Test Example A2 | 50 | 6.0 | 16.6 | 890 | 110 | 83 | 0.056 | 6.5 | Δ (note 2) |
| Test Example A3 | 50 | 6.0 | 16.6 | 890 | 110 | 83 | 0.056 | 6.5 | ○ (note 3) |
| Test Example A4 | 50 | 6.0 | 16.6 | 890 | 110 | 83 | 0.056 | 6.5 | ◉ (note 4) |
| Test Example A5 | 50 | 6.0 | 16.6 | 890 | 110 | 83 | 0.056 | 6.5 | ◉ |

Note 1) Particulates adhered to part of the side surface of the container immediately after operations commenced and spread over the entire side surface as operations continued, resulting in an abundance of particulates remaining on the bottom surface.
Note 2) Cone-shaped accumulation was noted in the center of the bottom surface.
Note 3) Slight adhesion was noted on some of the side surface, but this did not increase.
Note 4) There was no adhesion.

It could be confirmed on the basis of the Test Examples A above that it is advantageous to introduce heated gas from both the bottom side wall and bottom wall into the cylindrical container and to thus form a spirally ascending air current so as to dry wet particulates because there is less particulate adhesion and accumulation. It was also confirmed that it is more advantageous to introduce a greater amount of heated gas from the bottom side wall than from the bottom wall when heated gases are introduced from the bottom side wall and bottom wall perforated plate into the cylindrical container because there is less particulate adhesion and accumulation.

When the particulates described above were dried without the use of a dispersing device for the treated material in a conventional flash dryer (an apparatus in which particulates are dried simply by forming an ascending air current using heated gas in a straight pipe) for the sake of comparison, the particulates turned into wet lumps and thus could not be borne on the ascending air current, with many falling to the bottom of the dryer. Many of the particulates that were borne perforated plate into a straight pipe having an inside diameter of 250 mm and a length 5 times greater than the inside diameter, and the particulates were dried while borne on the spirally ascending air current (specifically, the particulates were dried using the apparatus depicted in FIG. 3).

The ratio of the amount of heated gas supplied from the bottom side wall and bottom wall perforated plate into the drying chamber 2b was 5:5.

The other particulate drying conditions and drying effects are given in Table 2.

TEST EXAMPLE B3

A spirally ascending air current was formed by introducing heated gas from the bottom side wall and bottom wall perforated plate into a container having a wider component with an inside diameter of 300 mm and a length of 250 mm midway (at a location 750 mm from the bottom wall) in a straight pipe having an inside diameter of 250 mm and a length 5 times greater than the inside diameter, and the particulates were dried while borne on the spirally ascending air current (specifically, the particulates were dried using the apparatus depicted in FIG. 13).

The ratio of the amount of heated gas supplied from the bottom side wall and bottom wall perforated plate into the drying chamber 2b was 5:5.

The other particulate drying conditions and drying effects are given in Table 2.

TEST EXAMPLE B4

A spirally ascending air current was formed by introducing heated gas in a tangential direction into a container having a widened component with an inside diameter of 350 mm and a length of 250 mm midway (at a location 750 mm from the bottom wall) in a straight pipe having an inside diameter of 250 mm and a length 5 times greater than the inside diameter, and the particulates were dried while borne on the spirally ascending air current (specifically, the particulates were dried using the apparatus depicted in FIG. 18).

The particulate drying conditions and drying effects are given in Table 2.

TEST EXAMPLE B5

A spirally ascending air current was formed by introducing heated gas from the bottom side wall and bottom wall perforated plate into a container having a widened component with an inside diameter of 350 mm and a length of 250 mm midway (at a location 750 mm from the bottom wall) in a straight pipe having an inside diameter of 250 mm and a length 5 times greater than the inside diameter and by introducing heated gas from the bottom side wall and bottom wall perforated plate into the above container, and the particulates were dried while borne on the spirally ascending air current (specifically, the particulates were dried using the apparatus depicted in FIG. 13).

The ratio of the amount of heated gas supplied from the bottom side wall and bottom wall perforated plate into the drying chamber 2b was 5:5.

The other particulate drying conditions and drying effects are given in Table 2.

TEST EXAMPLE B6

A spirally ascending air current was formed by using 95° C. hot water to heat the outer peripheral wall surfaces of a container having a widened component with an inside diameter of 350 mm and a length of 250 mm midway (at a location 750 mm from the bottom wall) in a straight pipe having an inside diameter of 250 mm and a length 5 times greater than the inside diameter and by introducing heated gas from the bottom side wall and bottom wall perforated plate into the above container, and the particulates were dried while borne on the spirally ascending air current (specifically, the particulates were dried using the apparatus depicted in FIG. 13, as the 95° C. hot water was supplied into a jacket).

The ratio of the amount of heated gas supplied from the bottom side wall and bottom wall perforated plate into the drying chamber 2b and 5:5.

The other particulate drying conditions and drying effects are given in Table 2.

TABLE 2

| | Particulate | Heated gas | | | | | Solid | Mfg. product |
|---|---|---|---|---|---|---|---|---|
| | amount fed (kg/hr) | Superficial velocity (m/sec) | Flow Rate (m³/min) | Weight (kg/hr) | Inlet temp. (° C.) | Outlet temp. (° C.) | air ratio (—) | moisture content (% WB) |
| Test Example B1 | 50 | 6.0 | 16.6 | 890 | 110 | 80 | 0.056 | 2.2 |
| Test Example B2 | 50 | 6.0 | 16.6 | 890 | 110 | 79 | 0.056 | 1.9 |
| Test Example B3 | 50 | 6.0 | 16.6 | 890 | 110 | 75 | 0.056 | 0.67 |
| Test Example B4 | 50 | 6.0 | 16.6 | 890 | 110 | 75 | 0.056 | 0.48 |
| Test Example B5 | 50 | 6.0 | 16.6 | 890 | 110 | 75 | 0.056 | 0.46 |
| Test Example B6 | 50 | 6.0 | 16.6 | 890 | 110 | 75 | 0.056 | 0.40 |

Note) No particulate adhesion or accumulation was noted in the apparatus in any of the test examples.

It could be confirmed on the basis of the Test Examples B above that no particulates adhered or accumulated when a spirally ascending air current was formed by introducing heated gas in a tangential direction into the cylindrical container to dry particulates that were already dry to a certain extent. It could also be confirmed that expanding the spiral diameter of the spirally ascending air current in the middle or heating the outer peripheral surface of the cylindrical container was extremely effective in improving the dry state of the particulates.

When the particulates described above were dried without the use of a dispersing device for the treated material in a conventional flash dryer for the sake of comparison, the final product had a moisture content of 4.0% WB. Because of the low initial moisture content, no particulate adhesion or accumulation inside the apparatus was observed.

TEST EXAMPLE C

Drying PVC (Polyvinyl Chloride) Resin Powder Having Moisture Content of 23% WB (mean particle diameter: 135 μm)

TEST EXAMPLE C1

A spirally ascending air current was formed by introducing heated gas and the particulates described above in a tangential direction into a straight pipe having an inside diameter of 350 mm and a length 5 times greater than the inside diameter, and the particulates were dried while borne on the spirally ascending air current (specifically, the particulates were dried using the apparatus depicted in FIG. 3).

The ratio of the amount of heated gas supplied from the bottom side wall and bottom wall perforated plate into the drying chamber 2b was 7:3.

The other particulate drying conditions and drying effects are given in Table 3.

TEST EXAMPLE C2

A spirally ascending air current was formed by introducing heated gas from the bottom side wall and bottom wall perforated plate into a container having a widened component with an inside diameter of 430 mm and a length of 350 mm midway (at a location 1050 mm from the bottom wall) in a straight pipe having an inside diameter of 350 mm and a length 5 times greater than the inside diameter, and the particulates were dried while borne on the spirally ascending air current (specifically, the particulates were dried using the apparatus depicted in FIG. 13).

The ratio of the amount of heated gas supplied from the bottom side wall and bottom wall perforated plate into the drying chamber 2b was 7:3.

The other particulate drying conditions and drying effects are given in Table 3.

TEST EXAMPLE C3

A spirally ascending air current was formed by introducing heated gas from the bottom side wall and bottom wall perforated plate into a container, which had a widened component with an inside diameter of 430 mm and a length of 350 mm as well as a perforated plate provided on the side surface of the wider part, midway (at a location 1050 mm from the bottom wall) in a straight pipe having an inside diameter of 350 mm and a length 5 times greater than the inside diameter, and the particulates were dried while borne on the spirally ascending air current as heated gas (secondary air) was also introduced from the perforated plate on the side wall of the wider part (specifically, the particulates were dried using the apparatus depicted in FIG. 14).

The ratio of the amount of heated gas supplied from the bottom side wall and bottom wall perforated plate into the drying chamber 2b was 7:3, and the amount of secondary air was 15% of the heated gas supplied form the bottom side wall and bottom wall perforated plate.

The other particulate drying conditions and drying effects are given in Table 3.

TEST EXAMPLE C4

A spirally ascending air current was formed by introducing heated gas from the bottom side wall and bottom wall perforated plate into a container, which had a perforated plate on the entire periphery of the side wall at a breadth of 40 mm in the heightwise direction, midway (at a location 1050 mm from the bottom wall) in a straight pipe having an inside diameter of 350 mm and a length 5 times greater than the inside diameter, and the particulates were dried while borne on the spirally ascending air current as heated gas (for an air ring) was also introduced from the perforated plate on the entire periphery of the side wall midway in the straight pipe (specifically, the particulates were dried using the apparatus depicted in FIG. 10).

The ratio of the amount of heated gas supplied from the bottom side wall and bottom wall perforated plate into the drying chamber 2b was 7:3, and the amount of heated gas for the air ring was 15% of the heated gas supplied form the bottom side wall and bottom wall perforated plate.

The other particulate drying conditions and drying effects are given in Table 3.

TEST EXAMPLE C5

A spirally ascending air current was formed by using heated steam with a pressure of 1 kg/cm$^2$-G to heat the outer peripheral wall surface between the bottom side wall perforated plate and bottom wall of a container which was a straight pipe having an inside diameter of 350 mm and a length 5 times greater than the inside diameter and which had a bottom side wall perforated plate located 175 mm from the bottom wall, and by introducing heated gas from the bottom side wall and bottom wall perforated plate into the container, and the particulates were dried while borne on the spirally ascending air current (specifically, the particulates were dried using the apparatus depicted in FIG. 15, but with the widened drying chamber 50 removed).

The ratio of the amount of heated gas supplied from the bottom side wall and bottom wall perforated plate into the drying chamber 2b was 8:2.

The other particulate drying conditions and drying effects are given in Table 3.

TEST EXAMPLE C6

A spirally ascending air current was formed by using heated steam with a pressure of 1 kg/cm$^2$-G to heat the outer peripheral wall surface between the bottom side wall perforated plate and bottom wall of a container which had a widened part with an inside diameter of 430 mm and a length of 350 mm and which had a bottom side wall perforated plate located 175 mm from the bottom wall midway (at a location 1050 mm from the bottom wall) in a straight pipe having an inside diameter of 350 mm and a length 5 times greater than the inside diameter, and by introducing heated gas from the bottom side wall and bottom wall perforated plate into the container, and the particulates were dried while borne on the spirally ascending air current (specifically, the particulates were dried using the apparatus depicted in FIG. 15).

The ratio of the amount of heated gas supplied from the bottom side wall and bottom wall perforated plate into the drying chamber 2b was 8:2.

The other particulate drying conditions and drying effects are given in Table 3.

TABLE 3

| Particulate | Heated gas | | | | | Solid | Mfg. product |
| --- | --- | --- | --- | --- | --- | --- | --- |
| amount fed (kg/hr) | Superficial velocity (m/sec) | Flow Rate (m³/min) | Weight (kg/hr) | Inlet temp. (° C.) | Outlet temp. (° C.) | air ratio (—) | moisture content (% WB) |
| Test Example C1 — 150 | 7.0 | 40.4 | 2063 | 120 | 73 | 0.073 | 3.0 |
| Test Example C2 — 220 | 7.0 | 40.4 | 2063 | 120 | 62 | 0.107 | 0.8 |
| Test Example C3 — 220 | 7.0 | 40.4 | 2063 | 120 | 62 | 0.093 | 0.5 |
| Test Example C4 — 220 | 7.0 | 40.4 | 2063 | 120 | 59 | 0.093 | 1.1 |
| Test Example C5 — 210 | 6.1 | 35.0 | 1829 | 120 | 71 | 0.115 | 0.3 |
| Test Example C6 — 210 | 6.1 | 35.0 | 1829 | 120 | 70 | 0.115 | 0.2 |

Note) In Test Examples C1 and C2, additional heated gas was supplied at 309 (kg/hr) (included in calculation of solid-air ratio).

It could be confirmed on the basis of Test Examples C that the particulate drying state was improved in an extremely effective manner when the spiral diameter of the spirally ascending air current in the cylindrical container was widened in the middle, and heated gas was introduced into the part with the widened spiral diameter, or when a rapidly spiraling air current, that is, an air ring, was formed at a location at any height in the cylindrical container, and the outer peripheral surface of the cylindrical container was heated at a location below the location where the air ring was formed.

TEST EXAMPLE D

Drying PVC (Polyvinyl Chloride) Resin Powder Having Moisture Content of 23% WB (mean particle diameter: 130 μm)

TEST EXAMPLE D1

The particulates described above were dried using a conventional flash dryer which had an inside diameter of 145 mm, a length of 14.5 m, and curved parts in three locations (specifically, the particulates were dried using the apparatus in FIG. 19, except that the cylindrical container 1 was removed).

The other particulate drying conditions and drying results are shown in Table 4.

TEST EXAMPLE D2

The particulates described above were dried using a device in which the outlet side end of the drying pipe of a conventional flash dryer which had an inside diameter of 145 mm, a length of 14.5 m, and curved parts in three locations was connected in a tangential direction to the bottom of a cylindrical container having an inside diameter of 250 mm and a length 5 times greater than the inside diameter (specifically, the particulates were dried using the apparatus in FIG. 19, except that the widened drying chamber 50 was removed).

The other particulate drying conditions and drying results are shown in Table 4.

TEST EXAMPLE D3

The particulates described above were dried using a device in which the outlet side end of the drying pipe of a conventional flash dryer which had an inside diameter of 145 mm, a length of 14.5 m, and curved parts in three locations was connected in a tangential direction to the bottom of a container in which a widened part with an inside diameter of 350 mm and a length of 250 mm was provided midway (at a location 750 mm from the bottom wall) in a cylindrical container having an inside diameter of 250 mm and a length 5 times greater than the inside diameter (specifically, the particulates were dried using the apparatus in FIG. 19).

The other particulate drying conditions and drying results are shown in Table 4.

TABLE 4

| | Particulate | Heated gas | | | | | Solid | Mfg. product |
|---|---|---|---|---|---|---|---|---|
| | amount fed (kg/hr) | Superficial velocity (m/sec) | Flow Rate (m³/min) | Weight (kg/hr) | Inlet temp. (° C.) | Outlet temp. (° C.) | air ratio (—) | moisture content (% WB) |
| Test Example D1 | 72 | 19.0 | 18.8 | 987 | 120 | 66 | 0.073 | 2.9 |
| Test Example D2 | 72 | 19.0 | 18.8 | 987 | 120 | 64 | 0.073 | 0.7 |
| Test Example D3 | 72 | 19.0 | 18.8 | 987 | 120 | 63 | 0.073 | 0.3 |

Note) The superficial velocity was the velocity of the heated gas in the flash drying. In Test Example D1, the outlet temperature was the inlet temperature of the particulate separator.

It could be confirmed on the basis of the Test Examples D above that the dry state of the particulates could be further improved at the heated gas temperature and flow rate used in the flash dryer when the outlet side end of the drying pipe of the conventional flash dryer was connected in a tangential direction to the bottom of the cylindrical container, and a spirally ascending air current was formed inside the cylindrical container using the drying method and apparatus pertaining to the present invention, so as to further dry particulates which had already been dried by a flash dryer.

INDUSTRIAL APPLICABILITY

The particulate drying method and apparatus pertaining to the present invention are a particulate drying method and apparatus which can improve the dry state of particulates by dispersing particulates in a dryer and by prolonging the residence time of the particulates while retaining the advantages of conventional flash dryers. Particulates which can be treated by the particulate drying method and apparatus pertaining to the present invention include various inorganic materials, organic materials, metals, and polymers. When the particulates being treated contain a variety of organic solvents, or when there is a danger of ignition or explosion due to the physical properties or the like of the particulates, an inert gas such as nitrogen gas should be used instead of air as the heated gas.

What is claimed is:

1. A method for drying particulates in a spirally ascending air current inside a cylindrical container having an internal space, the internal space having a horizontal cross section in the form of a concentric circle along a length of the internal space, the method comprising:

introducing heated gas in one tangential direction from a periphery of a bottom side wall of the cylindrical container, so as to form the spirally ascending air current in the cylindrical container, and introducing particulates to be dried into the internal space of the cylindrical container so that the particulates float in the spirally ascending air current in the cylindrical container.

2. The method for drying particulates according to claim 1, wherein the heated gas is introduced adjacent a bottom wall of the cylindrical container in a circumferential direction concentric with the cylindrical container together with the introduction of the heated gas in one tangential direction from the periphery of the bottom side wall of the cylindrical container, so as to form the spirally ascending air current in the cylindrical container.

3. The method for drying particulates according to claim 2, wherein an amount of the heated gas introduced from the periphery of the bottom side wall of the cylindrical container is equal to or greater than that of the heated gas introduced adjacent the bottom wall of the cylindrical container.

4. The method for drying particulates according to claim 1, wherein the cylindrical container is heated from the outer peripheral surface thereof.

5. The method for drying particulates according to claim 1, wherein the cylindrical container is constructed so as to be axially dividable.

6. The method for drying particulates according to claim 1, wherein the heated gas is also introduced in the same direction as spiraling direction of the spirally ascending air current at a location above the bottom wall of the cylindrical container, so as to form an air ring at the location.

7. The method for drying particulates according to claim 1, wherein a diameter of a spiral of the spirally ascending air current formed in the cylindrical container is wider in a middle of the spirally ascending air current.

8. The method for drying particulates according to claim 1, wherein a diameter of a spiral of the spirally ascending air current formed in the cylindrical container is wider in a middle of the spirally ascending air current, and the cylindrical container is heated from the outer peripheral surface at a location where the spiral diameter is wider.

9. The method for drying particulates according to claim 1, wherein a diameter of a spiral of the spirally ascending air current formed in the cylindrical container is wider in a middle of the spirally ascending air current, and the heated gas is also introduced in the same direction as the spiraling direction of the spirally ascending air current at a location where the spiral diameter is wider.

10. The method for drying particulates according to claim 1, wherein the heated gas is also introduced in the same direction as the spiraling direction of the spirally ascending air current at a location in the cylindrical container, so as to form an air ring at the location, and the cylindrical container is heated from the outer peripheral surface at a location below where the air ring has been formed.

11. An apparatus for drying particulates comprising:

a cylindrical container having an internal space, the internal space having a length with a horizontal cross section in the form of a concentric circle;

particulate and heated gas feed pipes which are connected to a bottom of the cylindrical container;

a spiraling mechanism for converting the heated gas introduced from the feed pipe into a spirally ascending air current inside the cylindrical container; and a particulate and heated gas exhaust pipe which is connected to the top of the cylindrical container, wherein a periphery of the bottom side wall of the cylindrical container is made of a perforated plate having a plurality of blow holes arranged so that openings thereof face in one tangential direction of the cylindrical container, a periphery of the perforated plate is enclosed by a bottom container, and the heated gas feed pipe is connected to the bottom container, thereby constituting the spiraling mechanism.

12. The apparatus for drying particulates according to claim 11, wherein the entire surface of the bottom wall of the cylindrical container is made of a perforated plate having a plurality of blow holes arranged with openings facing in one circumferential direction concentric with the cylindrical container.

13. The apparatus for drying particulates according to claim 11, wherein the heated gas feed pipe is connected to the bottom container enclosing the perforated plate in the tangential direction of the openings of the blow holes in the perforated plate face.

14. The apparatus for drying particulates according to claim 11, having a construction so that the outer peripheral wall surface of the cylindrical container is enclosed by a jacket, and a heat medium is supplied into the space formed between the jacket and the outer peripheral wall surface of the cylindrical container.

15. The apparatus for drying particulates according to claim 11, having a construction so that the entire periphery of the side wall at a location above the bottom side wall of the cylindrical container is made of a perforated side plate having a plurality of blow holes with openings facing in the same direction as the spiraling direction of the spirally ascending air current formed in the cylindrical container by the spiraling mechanism, the periphery of the perforated side plate is enclosed by a side container, and the heated gas feed pipe is connected to the side container, thereby forming an air ring at the location on the cylindrical container.

16. The apparatus for drying particulates according to claim 11, wherein the cylindrical container is a cylindrical container having an internal space with a middle section arranged between two end sections along an axis of the cylindrical container such that a horizontal cross section is in the form of concentric circles that are wider in the middle section than in the two end sections.

17. The apparatus for drying particulates according to claim 16, wherein an area of the horizontal cross section of the internal space at the middle section is 1.1 to 3.0 times wider than at the two end sections.

18. The apparatus for drying particulates according to claim 11, wherein the cylindrical container has an internal space with a middle section arranged between two end sections along an axis of the cylindrical container such that a horizontal cross section is in the form of concentric circles that are wider in the middle section than in the two end sections, the outer peripheral wall surface of the cylindrical container at the middle section where the internal space is wider is enclosed by a jacket, and a heat medium is supplied in a space formed between the jacket and the outer peripheral wall surface of the cylindrical container.

19. The apparatus for drying particulates according to claim 11, wherein the cylindrical container is a cylindrical container having an internal space with a middle section arranged between two end sections along an axis of the cylindrical container such that a horizontal cross section is in the form of concentric circles that are wider in the middle section than in the two end sections, the side wall of the cylindrical container at the part where the internal space is wider is made of a perforated side plate having a plurality of blow holes arranged so that openings thereof face in the same direction as the spiraling direction of the spirally ascending air current formed in the cylindrical container by the spiraling mechanism, the periphery of the perforated side plate is enclosed by a side container, and the heated gas feed pipe is connected to the side container.

20. The apparatus for drying particulates according to claim 11, having a construction so that the entire periphery of the side wall at a location above the bottom side wall of the cylindrical container is made of a perforated side plate having a plurality of blow holes with openings facing in the same direction as the spiraling direction of the spirally ascending air current formed in the cylindrical container by the spiraling mechanism, the periphery of the perforated plate is enclosed by a side container, and the heated gas feed pipe is connected to the side container, thereby forming an air ring at the location on the cylindrical container, while the outer peripheral wall surface of the cylindrical container at a location below where the air ring has been formed is enclosed by a jacket, and a heat medium is supplied in the space formed between the jacket and the outer peripheral wall surface of the cylindrical container.

* * * * *